(12) United States Patent
Watanabe et al.

(10) Patent No.: US 11,652,429 B2
(45) Date of Patent: May 16, 2023

(54) MOTOR CONTROL APPARATUS

(71) Applicant: Hitachi Astemo, Ltd., Hitachinaka (JP)

(72) Inventors: Kazuya Watanabe, Hitachinaka (JP); Yoshitaka Sugiyama, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 127 days.

(21) Appl. No.: 17/424,267

(22) PCT Filed: Jan. 10, 2020

(86) PCT No.: PCT/JP2020/000605
§ 371 (c)(1),
(2) Date: Jul. 20, 2021

(87) PCT Pub. No.: WO2020/153152
PCT Pub. Date: Jul. 30, 2020

(65) Prior Publication Data
US 2022/0069748 A1 Mar. 3, 2022

(30) Foreign Application Priority Data
Jan. 22, 2019 (JP) .............................. JP2019-008287

(51) Int. Cl.
*H02K 29/06* (2006.01)
*H02P 6/10* (2006.01)
(Continued)

(52) U.S. Cl.
CPC .............. *H02P 6/10* (2013.01); *B62D 5/0475* (2013.01); *H02M 1/0009* (2021.05);
(Continued)

(58) Field of Classification Search
CPC ........ H02P 6/10; H02P 21/22; H02M 5/0475; B62D 5/0475
(Continued)

(56) References Cited

U.S. PATENT DOCUMENTS

2003/0034699 A1* 2/2003 Selewski ................. A47L 9/188
310/50
2008/0252250 A1* 10/2008 Hida ....................... H02P 25/00
318/801
(Continued)

FOREIGN PATENT DOCUMENTS

JP         2013-121204 A        6/2013

OTHER PUBLICATIONS

International Preliminary Report on Patentability dated Jul. 27, 2021 issued in corresponding International Application No. PCT/JP2020/000605, with English translation, 12 pages.
(Continued)

*Primary Examiner* — Erick D Glass
(74) *Attorney, Agent, or Firm* — Foley & Lardner LLP

(57) ABSTRACT

A microcomputer stores an offset correction value for correcting an offset of a detected current along with a pulse shift for each of a detected current of a maximum phase to which power is supplied for the longest time among three phases and a detected current of a minimum phase to which power is supplied for the shortest time among the three phases, and corrects the detected current of each of the phases with use of the stored offset correction values for the detected current of the maximum phase and the detected current of the minimum phase.

10 Claims, 13 Drawing Sheets

(51) Int. Cl.
*H02P 21/22* (2016.01)
*H02M 1/00* (2006.01)
*B62D 5/04* (2006.01)
*H02M 7/5395* (2006.01)
*H02P 27/08* (2006.01)
*H02P 21/06* (2016.01)

(52) U.S. Cl.
CPC .......... *H02M 7/5395* (2013.01); *H02P 21/22* (2016.02); *H02P 27/08* (2013.01); *H02P 21/06* (2013.01)

(58) Field of Classification Search
USPC .................................................... 318/400.23
See application file for complete search history.

(56) References Cited

U.S. PATENT DOCUMENTS

2017/0104437 A1* 4/2017 Suzuki ................. H02P 29/032
2020/0086910 A1* 3/2020 Hirata ....................... H02P 9/06

OTHER PUBLICATIONS

International Search Report dated Mar. 10, 2020 issued in corresponding International application No. PCT/JP2020/000605, with English translation, 5 pages.

* cited by examiner

Fig. 9

| CURRENT DETECTION PATTERN | MINIMUM PHASE OFFSET CORRECTION VALUE | | MAXIMUM PHASE OFFSET CORRECTION VALUE | |
|---|---|---|---|---|
| | FIRST SYSTEM | SECOND SYSTEM | FIRST SYSTEM | SECOND SYSTEM |
| vu | $I_{vumin}a$ | $I_{vumin}b$ | $I_{vumax}a$ | $I_{vumax}b$ |
| wu | $I_{wumin}a$ | $I_{wumin}b$ | $I_{wumax}a$ | $I_{wumax}b$ |
| wv | $I_{wvmin}a$ | $I_{wvmin}b$ | $I_{wvmax}a$ | $I_{wvmax}b$ |
| uv | $I_{uvmin}a$ | $I_{uvmin}b$ | $I_{uvmax}a$ | $I_{uvmax}b$ |
| uw | $I_{uwmin}a$ | $I_{uwmin}b$ | $I_{uwmax}a$ | $I_{uwmax}b$ |
| vw | $I_{vwmin}a$ | $I_{vwmin}b$ | $I_{vwmax}a$ | $I_{vwmax}b$ |

Fig. 10

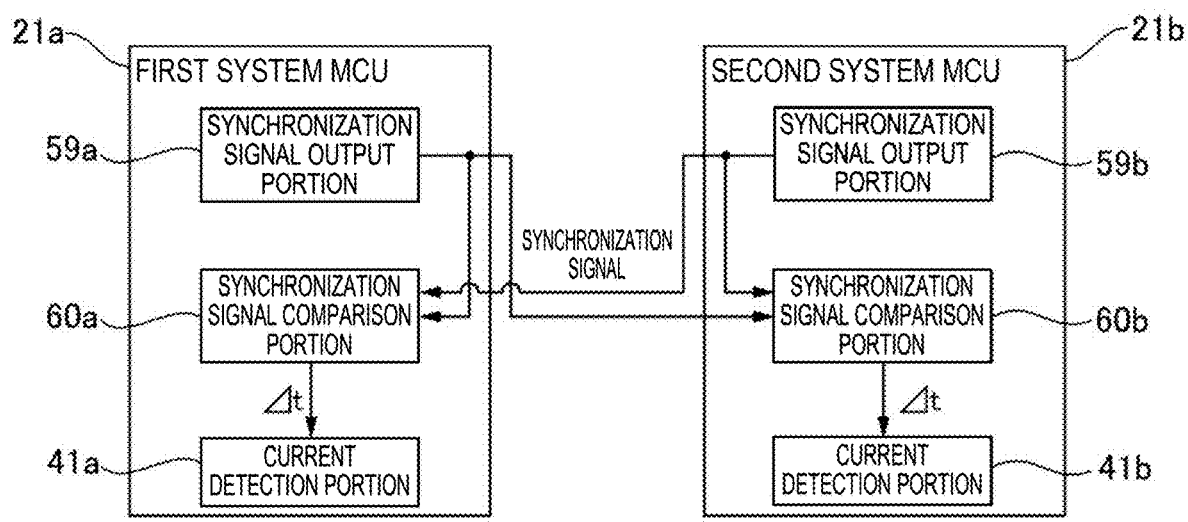

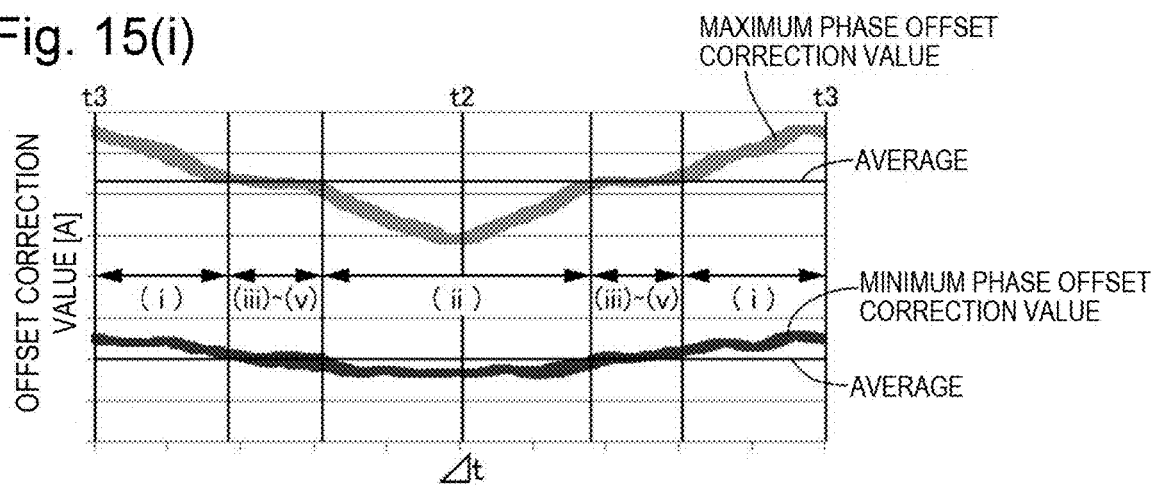
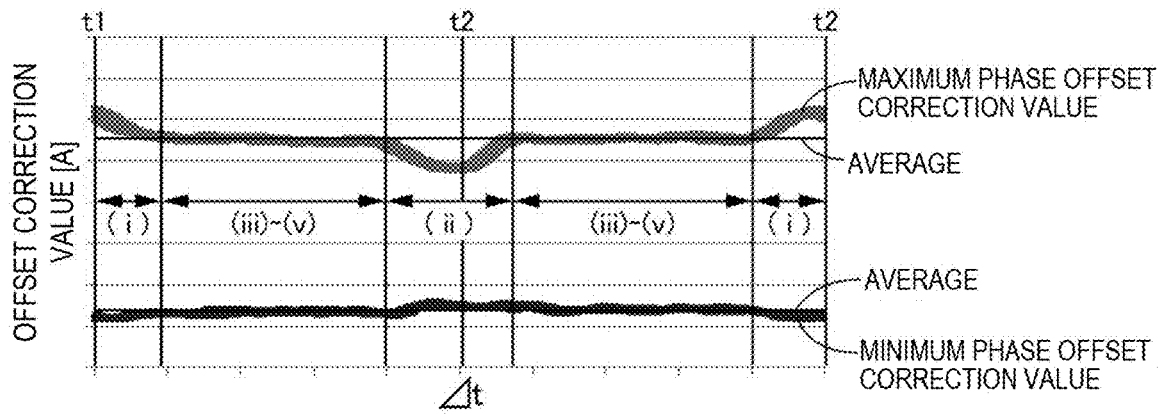

MOTOR CONTROL APPARATUS

TECHNICAL FIELD

The present invention relates to a motor control apparatus.

BACKGROUND ART

To detect current values of three phases (phase currents) in a three-phase brushless motor, a single-shunt current detection method detects a bus current value between a bridge circuit and a direct-current power source by one current sensor using shunt resistance, and reproduces the current values of the three phases based on this direct-current bus current value. At this time, if the PWM pulse widths of the respective phases resemble or match each other, this makes it difficult to sample the direct-current bus current value, thereby making it impossible to reproduce the current values of the two phases. Therefore, there is known a technique for preventing the two PWM pulse widths from resembling each other by conducting a so-called pulse shift of shifting switch timings of the respective phases (for example, refer to PTL 1).

CITATION LIST

Patent Literature

PTL 1: Japanese Patent Application Public Disclosure No. 2013-121204

SUMMARY OF INVENTION

Technical Problem

A redundant-system motor control apparatus including driving circuits and stator coils in a plurality of systems is subjected to a so-called torque ripple, in which the motor torque fluctuates with a constant period and a constant width due to a phase difference of a current ripple generated along with the pulse shift between the systems. There are needs demanding the suppression of this torque ripple.

Solution to Problem

One of the objects of the present invention is to provide a motor control apparatus capable of suppressing a torque ripple.

According to one aspect of the present invention, a motor control apparatus stores an offset correction value for correcting an offset of a detected current along with a pulse shift for each of a detected current of a maximum phase to which power is supplied for the longest time among three phases and a detected current of a minimum phase to which power is supplied for the shortest time among the three phases, and corrects the detected current of the maximum phase and the detected current of the minimum phase with use of the stored offset correction values for the detected current of the maximum phase and the detected current of the minimum phase.

Advantageous Effects of Invention

Therefore, according to the one aspect of the present invention, the torque ripple along with the pulse shift can be suppressed.

BRIEF DESCRIPTION OF DRAWINGS

FIG. 9 illustrates a list of offset correction values according to the current detection patterns.

FIG. 10 illustrates the configuration of inter-microcomputer communication according to the first embodiment.

FIG. 15(i) illustrates the settings of the offset correction values according to a time difference Δt in "vu detection" and "uv detection" patterns, and FIG. 15(ii) illustrates the settings of the offset correction values according to the time difference Δt in "wu detection", "wv detection", "uw detection", and "vw detection" patterns.

DESCRIPTION OF EMBODIMENTS

First Embodiment (Electric Power Steering)

Figure 1:
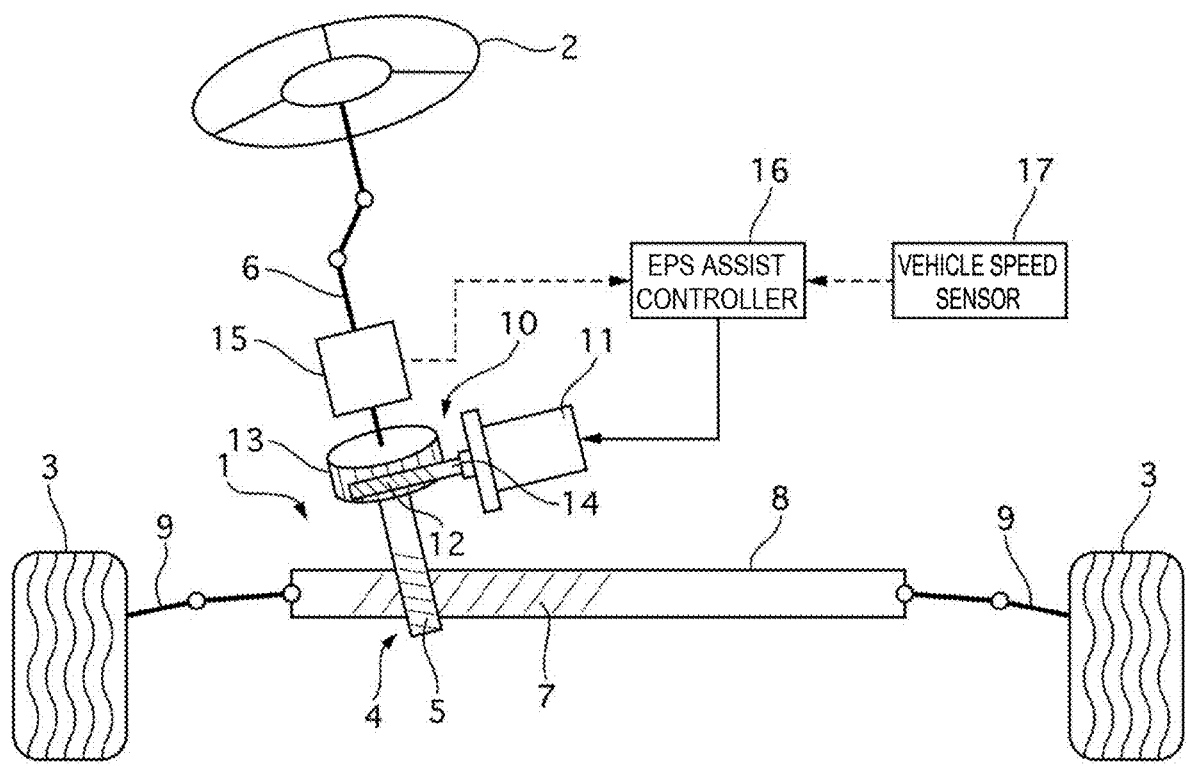
FIG. 1 illustrates the configuration of an electric power steering apparatus to which a motor control apparatus according to a first embodiment is applied.

FIG. 1 illustrates the configuration of an electric power steering apparatus to which a motor control apparatus according to a first embodiment is applied.

A steering mechanism 1 functions to turn front wheels (turning target wheels) 3 and 3 according to a rotation of a steering wheel 2, and includes a rack-and-pinion steering gear 4. A pinion gear 5 of the steering gear 4 is coupled with the steering wheel 2 via a steering shaft 6. A rack gear 7 of the steering gear 4 is provided on a rack shaft 8. Both the ends of the rack shaft 8 are coupled with the front wheels 3 and 3 via tie rods 9 and 9, respectively. A three-phase brushless motor (hereinafter referred to as a motor) 11 is coupled with the steering shaft 6 via a speed reducer 10. The speed reducer 10 includes a worm shaft 12 and a worm wheel 13. The worm shaft 12 is provided integrally with a motor shaft 14 of the motor 11. A rotational torque from the motor shaft 14 is transmitted to the steering shaft 6 via the speed reducer 10. A torque sensor 15, which detects a steering torque, is mounted on the steering shaft 6. An EPS assist controller 16 controls a driving current of the motor 11 based on the steering torque and the vehicle speed detected by a vehicle speed sensor 17 and applies a steering force for assisting the driver's steering to the steering mechanism 1.

(Motor Control Apparatus)

Figure 2:
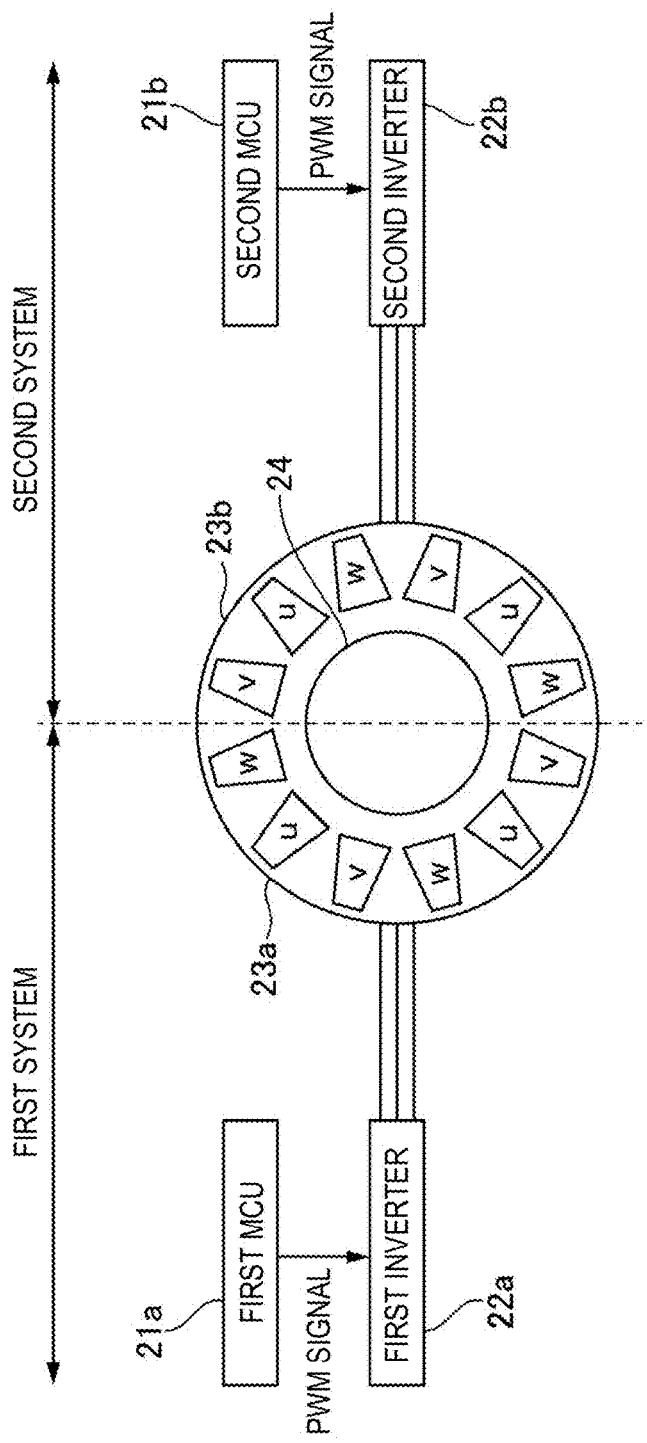
FIG. 2 illustrates the configuration of the motor control apparatus according to the first embodiment.

FIG. 2 illustrates the configuration of the motor control apparatus according to the first embodiment.

The motor control apparatus according to the first embodiment is a motor control apparatus redundantly including microcomputers 21, inverters 22, and stator coils 23 in two systems (a first system and a second system). Hereinafter, indexes a and b will be added at the ends of the respective reference numerals when a member provided in correspondence with the first system and a member provided in correspondence with the second system are distinguished from each other, but will be omitted when the members of these systems are not distinguished from each other. A first microcomputer 21a and a second microcomputer 21b operate independently of each other. The first microcomputer 21a controls the driving of a first inverter (a first driving circuit) 22a, thereby controlling a power supply state of a first stator coil 23a. The first stator coil 23a is a stator, and three coils are connected in the form of a star connection. The first stator coil 23a rotationally drives a motor rotor 24 according to a voltage applied to each phase (a first u phase, a first v phase, and a first w phase) based on the PWM control raw. The motor rotor 24 is a rotator, and is made of a magnet. The second microcomputer 21b controls the driving of a second inverter (a second driving circuit) 22b, thereby controlling a power supply state of a second stator coil 23b. The second stator coil 23b is a stator, and three coils are connected in the form of a star connection. The second stator coil 23b rotationally drives the motor rotor 24 according to a voltage applied to each phase (a second u phase, a second v phase, and a second w phase) based on the PWM control raw.

Figure 3:
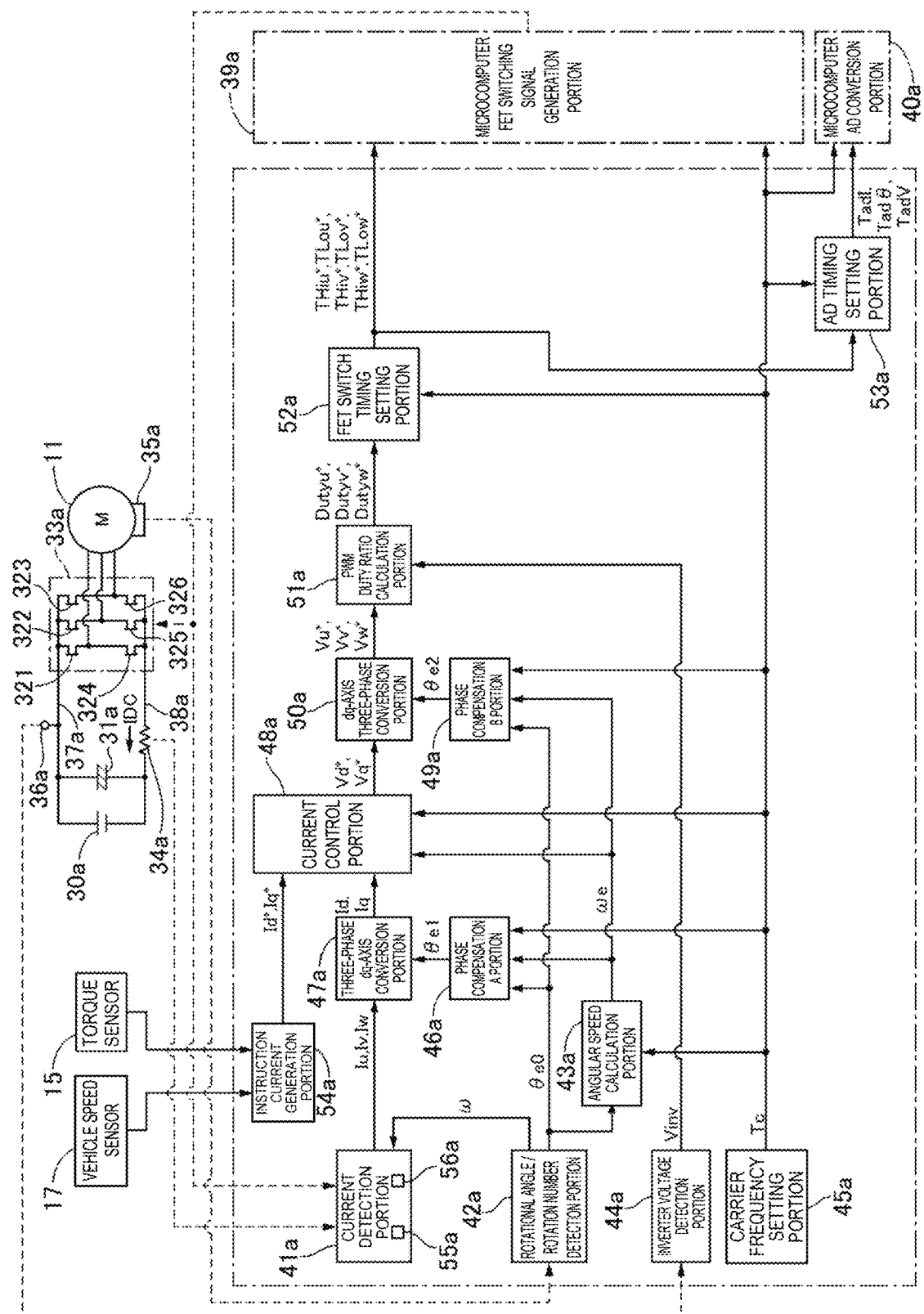
FIG. 3 illustrates the configuration of a first system in the motor control apparatus according to the first embodiment.

In the following description, the configuration of the first system in the motor control apparatus will be described. FIG. 3 illustrates the configuration of the first system in the motor control apparatus according to the first embodiment. The illustration and the description of the second system will be omitted here because the first system and the second system are identically configured, and the name of each member in the second system corresponds to the name of each member in the first system with "first" replaced with "second" at the beginning of the name and the reference numeral of each member in the second system corresponds to the reference numeral of each member in the first system with the index "a" replaced with "b".

The motor 11 is connected to a first direct-current power source 30a and a first smoothing capacitor 31a disposed in parallel with the first direct-current power source 30a via a first bridge circuit 33a including six FETs (field-effect transistors) 321, 322, 323, 324, 325, and 326 serving as the first inverter 22a. The first direct-current power source 30a may be shared with the second system. A first inverter voltage sensor 36a, which detects the voltage of the first inverter 22a, is provided in an upstream-side first direct-current bus 37a connecting the upstream side (the positive side) of the first smoothing capacitor 31a and the upstream side of the first bridge circuit 33a. Further, a first current sensor (shunt resistance) 34a, which detects a downstream-side direct-current bus current value, is provided in a downstream-side first direct-current bus 38a connecting the downstream side (the negative side) of the first smoothing capacitor 31a and the downstream side of the first bridge circuit 33a. A first rotational angle sensor 35a is provided.

The first rotational angle sensor 35a detects the motor electric angle (the rotational position of the motor rotor 24) of the motor 11.

The first microcomputer 21a generates switch timings THiu*, TLou*, THiv*, TLov*, THiw*, and TLow* of the FETs 321, 322, 323, 324, 325, and 326 on the High sides and the Low sides of the three phases in the first bridge circuit 33a for each of them based on respective values detected by the first current sensor 34a, the first rotational angle sensor 35a, and the first inverter voltage sensor 36a.

A first microcomputer FET switching signal generation portion 39a provides switching signals (a first u phase duty ratio signal, a first v phase duty ratio signal, and a first w phase duty ratio signal) to the six FETs 321, 322, 323, 324, 325, and 326 based on a PWM carrier period Tc as a time base therefor.

A first microcomputer AD conversion portion 40a carries out an AD conversion at AD timings TadI, Tadθ, and TadV based on a signal synchronized with the control cycle that is generated from the PWM carrier period Tc.

In the following description, the configuration of the first microcomputer 21a will be described in detail.

A first instruction current generation portion 54a inputs the vehicle speed from the vehicle speed sensor 17 along with inputting the steering torque from the torque sensor 15, and sets the assist torque according to the steering torque and the vehicle speed. The first instruction current generation portion 54a generates instruction currents (a first instruction signal) Id* and Iq* for causing the motor 11 to output a torque as high as the assist torque.

A first current detection portion 41a inputs a first direct-current bus current (a first detected current signal) IDC flowing in the downstream-side first direct-current bus 38a from the first current sensor 34a and the number of motor rotations ω from a first rotational angle/rotation number detection portion 42a, and reproduces (estimates) phase currents flowing in the three phases. The first current detection portion 41a inputs the downstream-side first direct-current bus current IDC when the switching signal of a maximum phase (a first maximum phase) to which power is supplied for the longest time among the switching signals (a first maximum phase duty ratio signal) and the switching signal of an intermediate phase are turned on and the switching signal of a minimum phase (a first minimum phase) to which power is supplied for the shortest time (a first minimum phase duty ratio signal) is turned off (the first detection timing), and the downstream-side first direct-current bus current IDC when the switching signal of the maximum phase is turned on and the switching signals of the minimum phase and the intermediate phase are turned off (the second detection timing). The downstream-side first direct-current bus current IDC is such a current that an alternating-current voltage is generated from the first direct-current power source 30a according to the switching of the first bridge circuit 33a and the phase currents of the three phases flow in the motor 11, and an instantaneous current flows in the first current sensor 34a due to an instantaneous voltage generated according to a difference between the switch timings in this bridge circuit 33a. The first current detection portion 41a derives the phase currents of the three phases from the switch timings based on the switching signals from the first microcomputer FET switching signal generation portion 39a and the values of the downstream-side first direct-current bus current IDC at these times.

Figure 4:
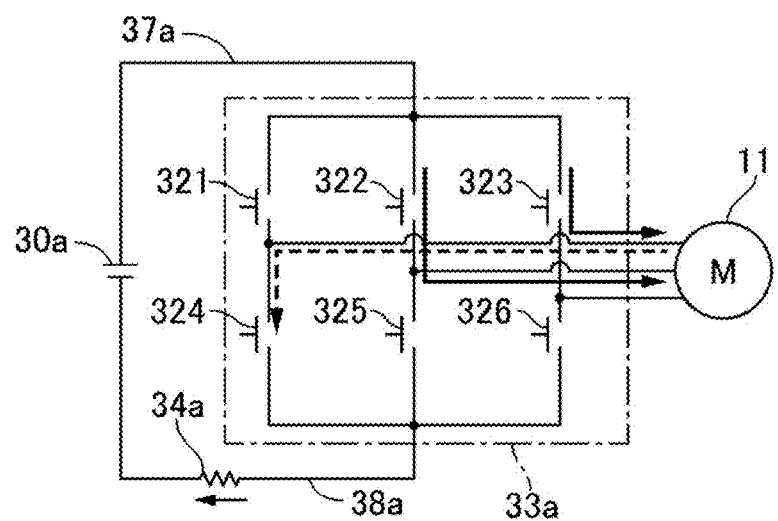
FIG. 4 illustrates the state of a first bridge circuit 33a at the first detection timing.
Figure 5:
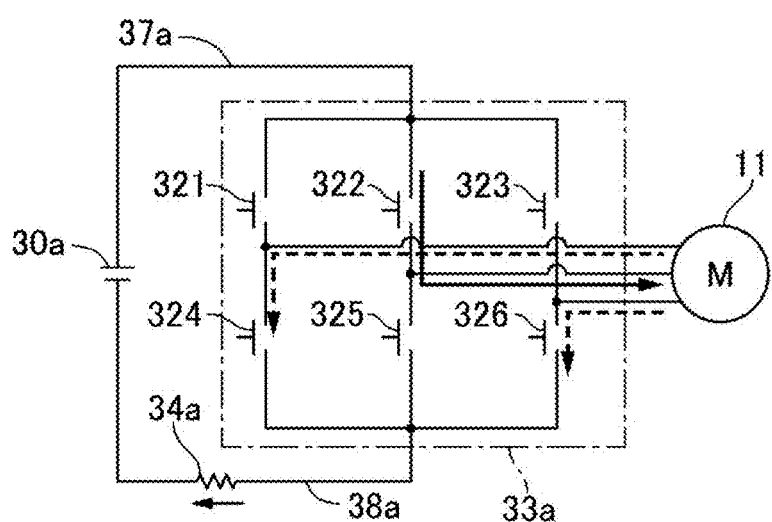
FIG. 5 illustrates the state of the first bridge circuit 33a at the second detection timing.

FIGS. 4 and 5 illustrate a specific example of the single-shunt current detection method. FIG. 4 illustrates the state of the first bridge circuit 33a at the first detection timing, and FIG. 5 illustrates the state of the first bridge circuit 33a at the second detection timing.

At the first detection timing, the switching signals are turned on for the first v phase as the maximum phase and first w phase as the intermediate phase and off for the first u phase as the minimum phase, and therefore the upper-side FETs 322 and 323 and the lower-side FETs 324 are switched on in the first bridge circuit 33a, and the downstream-side first direct-current bus current IDC can be deemed as being equivalent to the current value of the first u phase by inverting the sign. Therefore, at the first detection timing, the current value of the first u phase as the minimum phase can be detected by the first current sensor 34a.

On the other hand, at the second detection timing, the switching signals are turned off for the first u phase as the minimum phase and the first w phase as the intermediate phase and on for the first v phase as the maximum phase, and therefore the upper-side FET 322 and the lower-side FETs 324 and 326 are switched on in the first bridge circuit 33a, and the downstream-side first direct-current bus current IDC can be deemed as being equivalent to the current value of the first v phase. Therefore, at the second detection timing, the current value of the first v phase as the maximum phase can be detected by the first current sensor 34a.

In this manner, according to the single-shunt current detection method, the current of each of the phases can be reproduced by detecting the instantaneous current flowing in the downstream-side first direct-current bus 38a when a voltage difference (a time difference in the PWM pulse) is generated among the individual phases during a half of one PWM carrier period.

The first current detection portion 41a performs a so-called pulse shift, which arbitrarily shifts the switch timing of each of the phases when reproducing the current of each of the phases. More specifically, the first current detection portion 41a corrects the phase of the timing of turning on the switching signal of the maximum phase or the intermediate phase in such a manner that the difference between the timings of turning on the switching signals of the maximum phase and the intermediate phase matches or exceeds a second predetermined value larger than a first predetermined value when the difference between the timing of turning on the switching signal of the maximum phase and the timing of turning on the switching signal of the intermediate phase falls below the first predetermined value. Along therewith, the first current detection portion 41a corrects the phase of the switching signal of the intermediate phase or the minimum phase in such a manner that the difference between the timings of turning on the switching signals of the intermediate phase and the minimum phase matches or exceeds the second predetermined value when the difference between the timing of turning on the switching signal of the intermediate phase and the timing of turning on the switching signal of the minimum phase falls below the first predetermined value. The first predetermined value is an upper limit value on the difference between the timings of turning on the switching signals with which it is difficult to sample the downstream-side first direct-current bus current IDC and impossible to reproduce the phase current value. The second predetermined value is a lower limit value on the difference between the timings of turning on the switching signals with which it is possible to sample the downstream-side first direct-current bus current IDC and possible to reproduce the phase current value.

Figure 6:
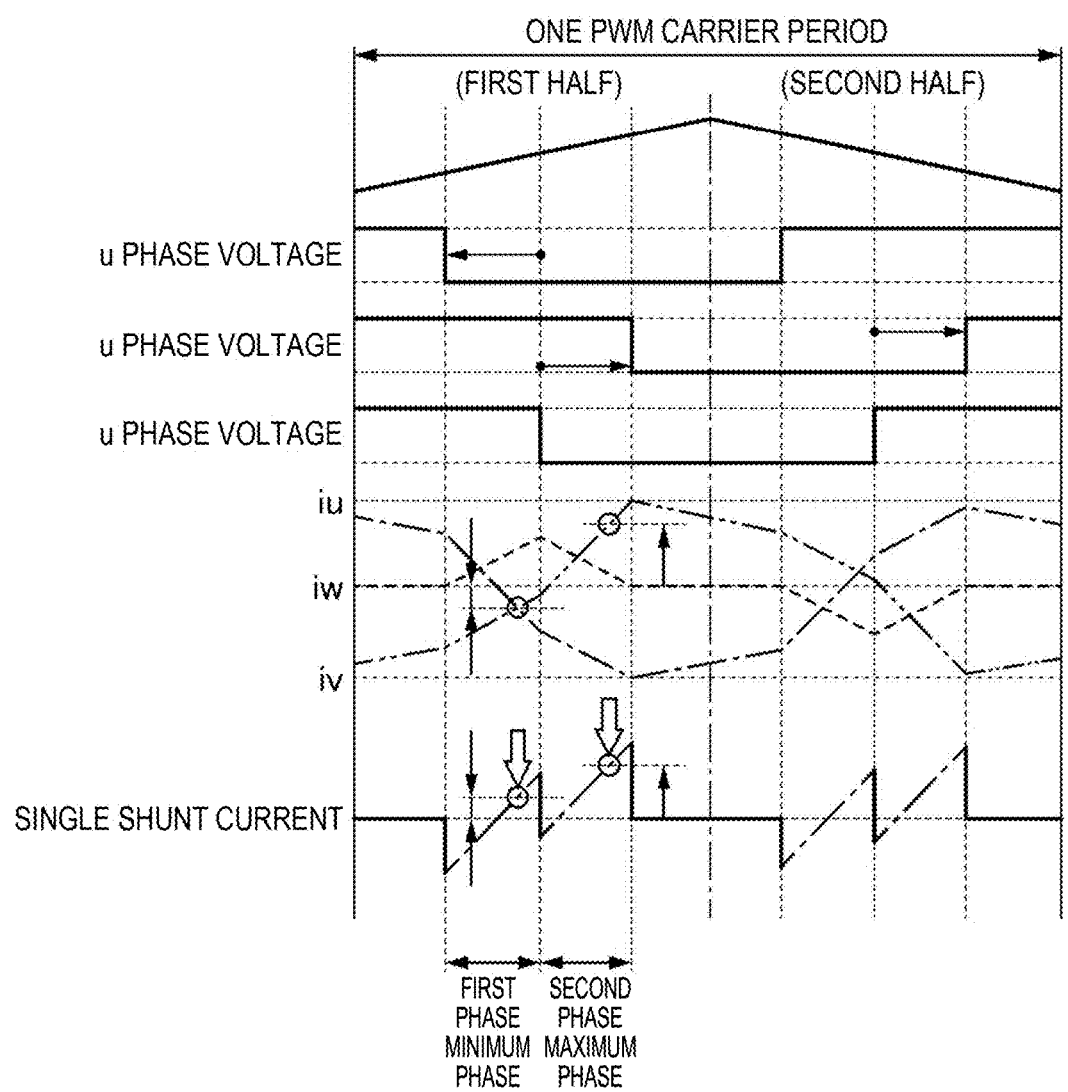
FIG. 6 illustrates a specific example of a pulse shift in one PWM carrier period.

FIG. 6 illustrates a specific example of the pulse shift in one PWM carrier period, in which the pulse width of the first u phase as the minimum phase is reduced (the voltage instruction is corrected for a reduction) and the pulse width of the first v phase as the maximum phase is increased (the voltage instruction is corrected for an increase). As illustrated in FIG. 6, when the pulse shift is conducted, the voltage instantaneously drops in the first u phase with the pulse width thereof reduced and instantaneously rises in the first v phase with the pulse width therefore increased, and therefore a current ripple is generated. The phase currents reproduced by the single-shunt current detection method should be subjected to an offset correction to suppress the current ripple generated along with the pulse shift.

Then, in the redundant-system motor control apparatus including the inverters (the driving circuits) and the stator coils in the two systems, like the first embodiment, when the phase of the PWM waveform is different between the respective inverters, this leads to a difference in the phase of the current ripple generated in addition to the current flowing in each of the phases, thereby leading to a difference in the flowing current between the two systems and thus resulting in a change in mutual inductance of a specific phase. Due to this influence, the current ripple generated along with the pulse shift varies for each current detection pattern of the pulse shift. The current value detected in a section where the voltages of the three phases are not equilibrium during one PWM period is a sum of the originally flowing current and the current ripple. The single-shunt current detection method can detect the currents in two phases based on the downstream-side first direct-current bus current IDC at the time of the two switch timings, but the current ripple generated at the first detection timing and the current ripple generated at the second detection timing are different from each other. More specifically, in the case of FIG. 6, the magnitude of the current is different between the current ripple in the minimum phase (the first u phase) at the first detection timing and the current ripple in the maximum phase (the first v phase) at the second detection timing. For this reason, if the phase current is corrected with use of the same offset correction value for each of the current detection patterns, a so-called torque ripple, in which the motor torque fluctuates with a constant cycle and a constant width, occurs due to interference between the current flowing in the first stator coil 23a and the current flowing in the second stator coil 23b. The occurrence of the torque ripple on the electric power steering apparatus may impair the steering performance and make the driver feel uncomfortable.

Under these circumstances, with the aim of suppressing the occurrence of the torque ripple, in the motor control apparatus according to the first embodiment, the first current detection portion 41a includes a first current ripple correction portion (a first detected current correction portion) 55a, which stores each of a maximum phase offset correction value and a minimum phase offset correction value for eliminating the torque ripple in each of the current detection patterns for each of the current detection patterns in advance, and corrects a maximum phase current (a first maximum phase detected current) corresponding to the maximum phase and a minimum phase current (a first minimum phase detected current) corresponding to the minimum phase among the phase currents reproduced from the downstream-side first direct-current bus current IDC (a first u phase detected current, a first v phase detected current, and a first w phase detected current), thereby outputting corrected phase currents (a first u phase detected current signal, a first v phase detected current signal, and a first w phase detected current signal) Iu, Iv, and Iw. The details of the first current ripple correction portion 55a will be described below.

The first rotational angle/rotation number detection portion 42a inputs a motor electric angle θe0 from the first rotational angle sensor 35a and calculates the number of motor rotations ω based on the difference between the present value and the previous value of the motor electric angle θe0.

A first angular speed calculation portion 43a inputs the motor electric angle θe0 and the PWM carrier period Tc, and calculates an electric angular speed ωe based on the difference between the present value and the previous value of the motor electric angle θe0. The first angular speed calculation portion 43a includes a digital filter that removes a vibration component in the electric angler speed ωe. This provision can prevent the calculated electric angular speed ωe from becoming vibrational even when a detection error is contained in the motor electric angle θe0.

A first inverter voltage detection portion 44a acquires an inverter voltage Vinv from the first inverter voltage sensor 36a.

A first carrier frequency setting portion 45a sets and outputs the PWM carrier period Tc.

A first phase compensation A portion 46a inputs the motor electric angle θe0, the number of motor rotations ω, the electric angular speed ωe, and the PWM carrier period Tc, and corrects the motor electric angle θe0 into a motor electric angle θe1 when the downstream-side first direct-current bus current IDC is detected by the first current detection portion 41a.

A first three-phase dq-axis conversion portion 47a inputs the phase currents Iu, Iv, and Iw and the motor electric angle θe1, and applies a coordinate conversion for vector control that converts three-phase alternating currents into two-axis direct currents to output a magnetic flux (d axis) current Id and a torque (q axis) current Iq.

A first current control portion 48a inputs the instruction currents Id* and Iq*, the magnetic flux current Id, the torque current Iq, the electric angular speed ωe, and the PWM carrier period Tc, and outputs a d-axis instruction voltage (a first second instruction signal) Vd* and a q-axis instruction voltage (the first second instruction signal) Vq* for causing the magnetic flux current Id and the torque current Iq to follow the instruction currents Id* and Iq*, respectively.

A first phase compensation B portion 49a inputs the motor electric angle θe0, the electric angular speed ωe, and the PWM carrier period Tc, and corrects the motor electric angle θe0 into a motor electric angle θe2 when the d-axis instruction voltage Vd* and the q-axis instruction voltage Vq* are applied to the motor 11.

A first dq-axis three-phase conversion portion 50a inputs the d-axis instruction voltage Vd*, the q-axis instruction voltage Vq*, and the motor electric angle θe2, and applies a coordinate conversion so as to return the two-axis direct currents for the vector control into the actual three-phase alternating currents to output three-phase voltage instructions Vu*, Vv*, and Vw*.

A first PWM duty ratio calculation portion (a first PWM duty ratio signal generation portion) 51a inputs the three-phase voltage instructions Vu*, Vv*, and Vw* and an inverter voltage Vinv, and outputs three-phase instruction (the first u phase duty ratio signal, the first v phase duty ratio signal, and the first w phase duty ratio signal) duty ratios Dutyu*, Dutyv*, and Dutyw* based on the ratio among the three-phase voltage instructions Vu*, Vv*, and Vw*.

A first FET switch timing setting portion 52a inputs the three-phase duty ratios Dutyu*, Dutyv*, and Dutyw* and the PWM carrier period Tc, and compares them and generates the switch timings THiu*, TLou*, THiv*, TLov*, THiw*, and TLow* of the FETs 321, 322, 323, 324, 325, and 326 on the High sides and the Low sides of the three phases in the first bridge circuit 33a for each of them.

A first AD timing setting portion 53a inputs the switch timings THiu*, TLou*, THiv*, TLov*, THiw*, and TLow* and the PWM carrier period Tc, and sets the AD timings TadI, Tadθ, and TadV of detecting the downstream-side first direct-current bus current IDC, the motor electric angle θe0, and the inverter voltage Vinv based on the switch timings THiu*, TLou*, THiv*, TLov*, THiw*, and TLow*.

(First Current Ripple Correction Portion)

Figure 7:
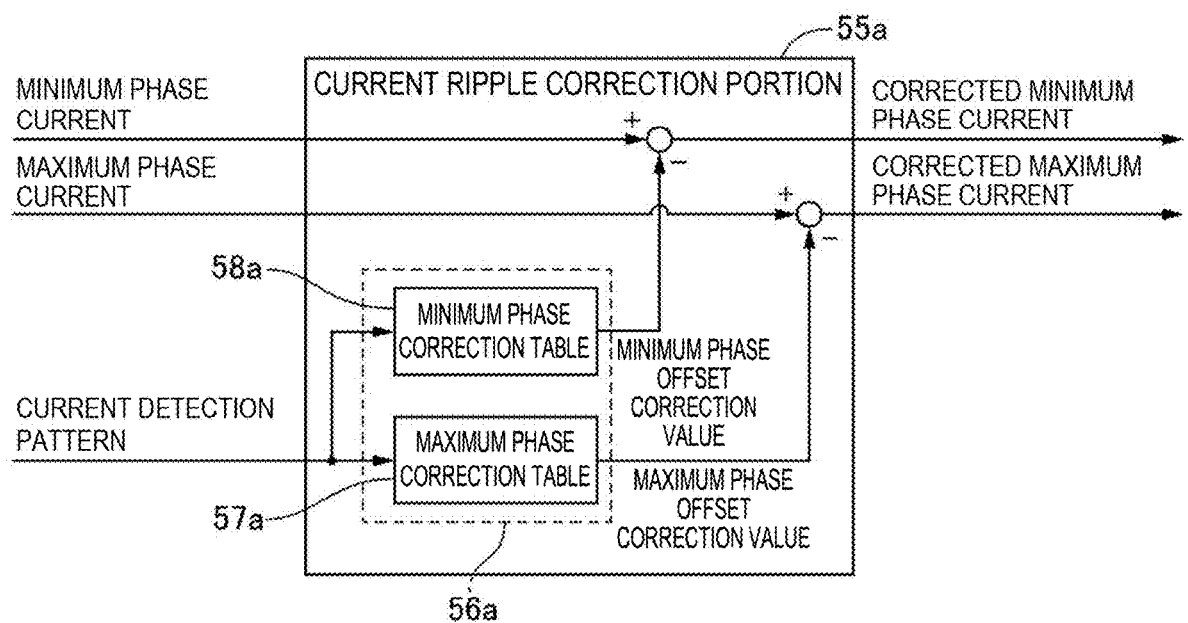
FIG. 7 illustrates the configuration of a first current ripple correction portion 55a according to the first embodiment.

FIG. 7 illustrates the configuration of the first current ripple correction portion 55a according to the first embodiment.

The first current ripple correction portion 55a includes a first offset correction value selection portion 56a. The first offset correction value selection portion 56a selects the maximum phase offset correction value and the minimum phase offset correction value according to the current detection pattern based on the maximum phase offset correction value and the minimum phase offset correction value for each of the current detection patterns that are stored in a first maximum phase correction table (a first offset correction value storage portion) 57a and a first minimum phase correction table (the first offset correction value storage portion) 58a in advance, respectively. The first current ripple correction portion 55a outputs a corrected maximum phase current and a corrected minimum phase current by reducing the selected maximum phase offset correction value and minimum phase offset correction value from the maximum phase current and the minimum phase current, respectively.

The first current ripple correction portion 55a continues correcting the maximum phase current and the minimum phase current even when the second inverter 22b of the second system is in a stopped state (a state of not outputting the PWM duty ratio signal) due to a failure or the like.

(Current Detection Pattern)

Figure 8:
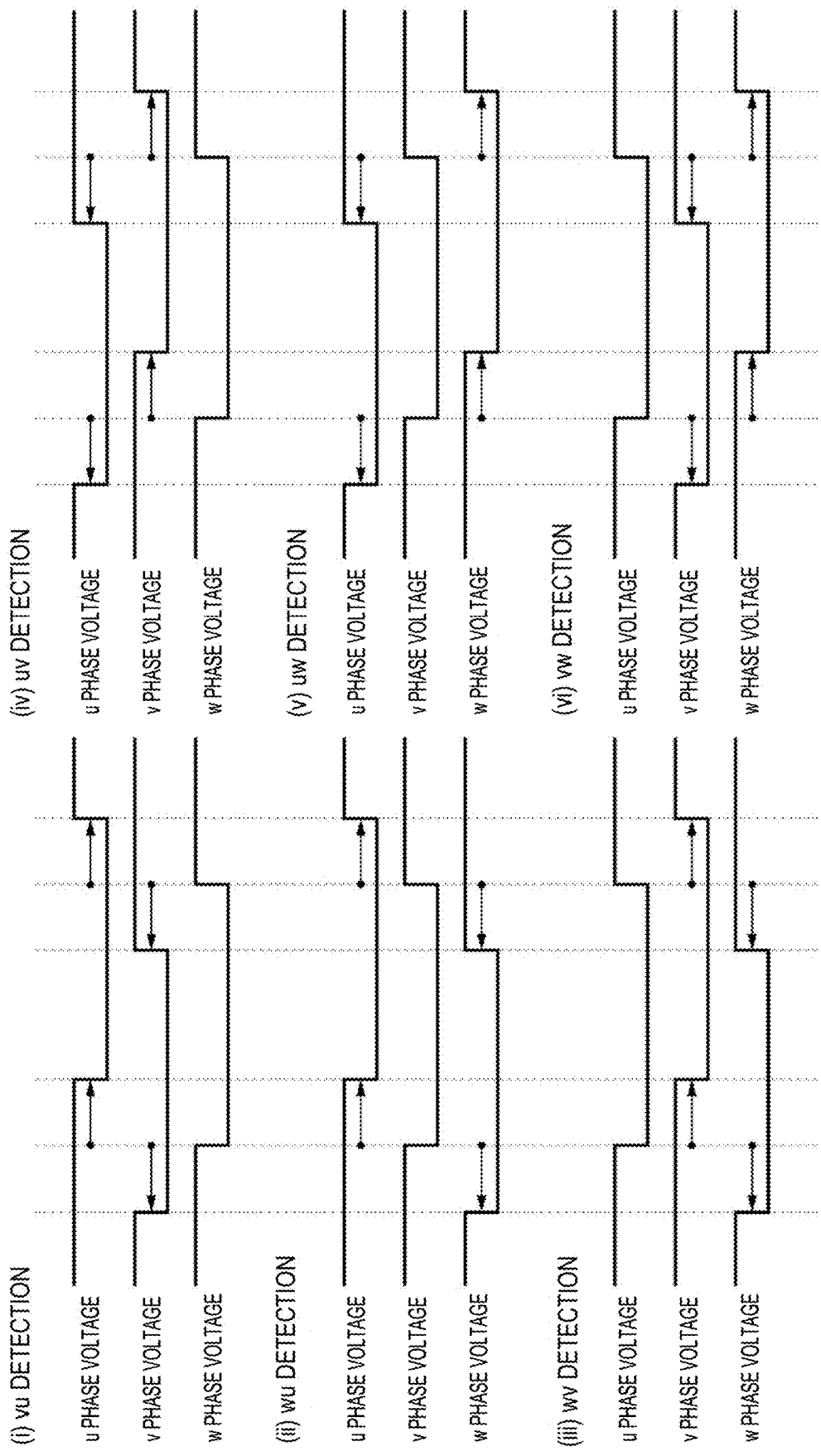
FIG. 8 illustrate a list of current detection patterns in one PWM carrier period.

FIG. 8 illustrate a list of current detection patterns in one PWM carrier period.

The current detection pattern, i.e., the pattern of the pulse shift when the current is detected by the single-shunt current detection method comes in six types of patterns illustrated in FIG. 8. In a "vu detection" pattern, the first u phase is the maximum phase and the first v phase is the minimum phase, and the first v phase current is detected at the first timing and the first u phase current is detected at the second timing. In a "wu detection" pattern, the first u phase is the maximum phase and the first w phase is the minimum phase, and the first u phase current is detected at the first timing and the first u phase current is detected at the second timing. In a "wv detection" pattern, the first v phase is the maximum phase and the first w phase is the minimum phase, and the first w phase current is detected at the first timing and the first v phase current is detected at the second timing. In a "uv detection" pattern, the first v phase is the maximum phase and the first u phase is the minimum phase, and the first u phase current is detected at the first timing and the first v phase current is detected at the second timing. In a "uw detection" pattern, the first w phase is the maximum phase and the first u phase is the minimum phase, and the first u phase current is detected at the first timing and the first w phase current is detected at the second timing. In a "vw detection" pattern, the first w phase is the maximum phase and the first v phase is the minimum phase, and the first v phase current is detected at the first timing and the first w phase current is detected at the second timing.

(Offset Correction Value)

FIG. 9 illustrates the list of offset correction values according to the current detection patterns. The offset correction values will be described focusing on the offset correction values for the first system in the following description, but the same also applies to the offset correction values for the second system.

The minimum phase offset correction value (a first v phase minimum phase offset correction value) and the maximum phase offset correction value (a first u phase maximum phase offset correction value) in the "vu detection" pattern are Ivumina and Ivumaxa, respectively. The minimum phase offset correction value (a first w phase minimum phase offset correction value) and the maximum phase offset correction value (the first u phase maximum phase offset correction value) in the "wu detection" pattern are Iwumina and Iwumaxa, respectively. The minimum phase offset correction value (the first w phase minimum phase offset correction value) and the maximum phase offset correction value (a first v phase maximum phase offset correction value) in the "wv detection" pattern are Iwvmina and Iwvmaxa, respectively. The minimum phase offset correction value (a first u phase minimum phase offset correction value) and the maximum phase offset correction value (the first v phase maximum phase offset correction value) in the "uv detection" pattern are Iuvmina and Iuvmaxa, respectively. The minimum phase offset correction value (the first u phase minimum phase offset correction value) and the maximum phase offset correction value (a first w phase maximum phase offset correction value) in the "uw detection" pattern are Iuwmina and Iuwmaxa, respectively. The minimum phase offset correction value (the first v phase minimum phase offset correction value) and the maximum phase offset correction value (the first w phase maximum phase offset correction value) in the "vw detection" pattern are Ivwmina and Ivwmaxa, respectively.

The first microcomputer 21a outputs the PWM duty ratio signal for a duty ratio of 50% in a state that the output of the PWM duty ratio signal of the second system is stopped at the time of, for example, calibration, and learns the current ripple generated along with the pulse shift in each of the current detection patterns and sets values for eliminating this current ripple as the offset correction values. The first microcomputer 21a stores each maximum phase offset correction value into the first maximum phase correction table 57a and stores each minimum phase offset correction value into the first minimum phase correction table 58a among the set respective offset correction values.

(Inter-Microcomputer Communication)

FIG. 10 illustrates the configuration of inter-microcomputer communication according to the first embodiment.

The first microcomputer 21a and the second microcomputer 21b transmit and receive a synchronization signal via inter-microcomputer communication. The inter-microcomputer communication will be described focusing on the inter-microcomputer communication for the first system in the following description, but the same also applies to the inter-microcomputer communication for the second system.

The first microcomputer 21a includes a first synchronization signal output portion 59a and a first synchronization signal comparison portion 60a as a first inter-microcomputer communication portion. The first synchronization signal output portion 59a generates a High/Low signal synchronized with N (integer) times of the PWM carrier period Tc output from the first carrier frequency setting portion 45a and configured to reveal the start or the end of an n period of the PWM carrier period Tc and sets it as the synchronization signal, and outputs it to a second synchronization signal comparison portion 60b of the second microcomputer 21b. The High/Low signal may be replaced with a trigger signal.

The first synchronization signal comparison portion 60a outputs a time difference Δt between High/Low switching positions (rise and drop positions) of the synchronization signal output from the second synchronization signal output portion 59b of the second microcomputer 21b and the synchronization signal output from the first synchronization signal output portion 59a to the first current detection portion 41a.

The first current detection portion 41a estimates the state of phase misalignment in the PWM duty ratio signal between the same phases of the two systems based on the time difference Δt between the High/Low switching positions of these synchronization signals.

Figure 11:
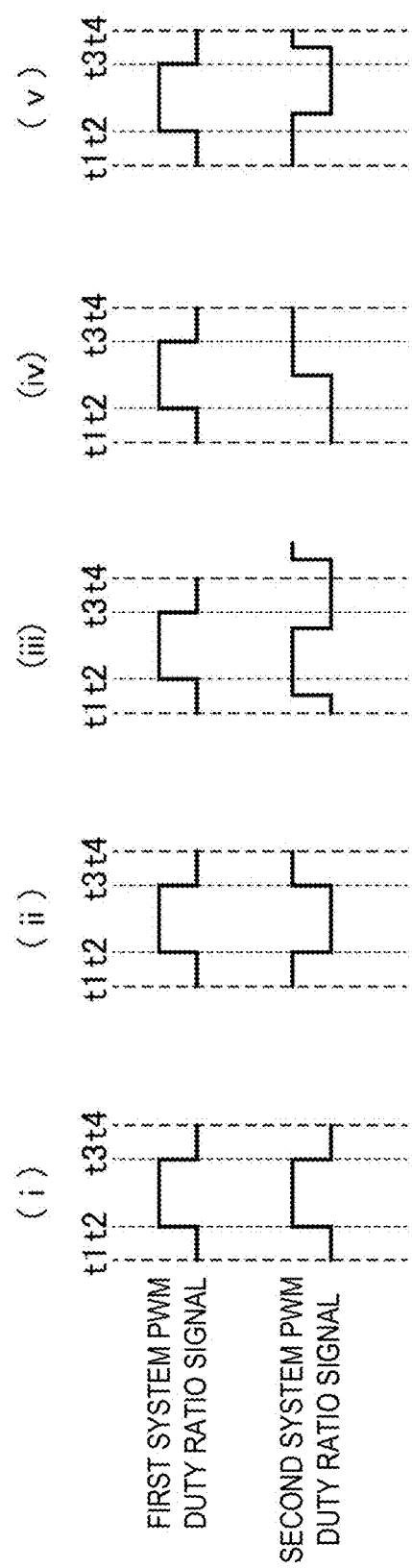
FIG. 11 illustrate the relationship between the phase of a PWM duty ratio signal in the first system and the phase of a PWM duty ratio signal in the second system.

FIG. 11 illustrate the relationship between the phase of the PWM duty ratio signal in the first system and the phase of the PWM duty ratio signal in the second system.

FIG. 11(i) illustrates a state in which the PWM duty ratio signals of the two systems are switched from the Low state to the High state at the same timing and from the High state to the Low state at the same timing.

FIG. 11(ii) illustrates a state in which the PWM duty ratio signal of one of the systems is switched from the Low state to the High state and the PWM duty ratio signal of the other of the systems is switched from the High state to the Low state at the same timing.

FIGS. 11(iii) to (v) illustrate states other than FIGS. 11(i) and (ii).

In the following description, the state (i), the state (ii), and the states (iii) to (v) between the first u phase duty ratio signal and the second u phase duty ratio signal will be referred to as a "first state", a "second state", and a "third state", respectively. The state (i), the state (ii), and the states (iii) to (v) between the first v phase duty ratio signal and the second v phase duty ratio signal will be referred to as a "fourth state", a "fifth state", and a "sixth state", respectively. The state (i), the state (ii), and the states (iii) to (v) between the first w phase duty ratio signal and the second w phase duty ratio signal will be referred to as a "seventh state", an "eighth state", and a "ninth state", respectively.

The first current ripple correction portion 55a corrects the maximum phase current and the minimum phase current when determining that the state of the phase misalignment is the third state, the sixth state, or the ninth state.

Next, advantageous effects of the first embodiment will be described.

The motor control apparatus according to the first embodiment includes the maximum phase correction table 57 and the minimum phase correction table 58, which store the maximum phase offset correction value and the minimum phase offset correction value, respectively, and the current ripple correction portion 55, which corrects the maximum phase current and the minimum phase current with use of the maximum phase offset correction value and the minimum phase offset correction value.

Figure 12I:
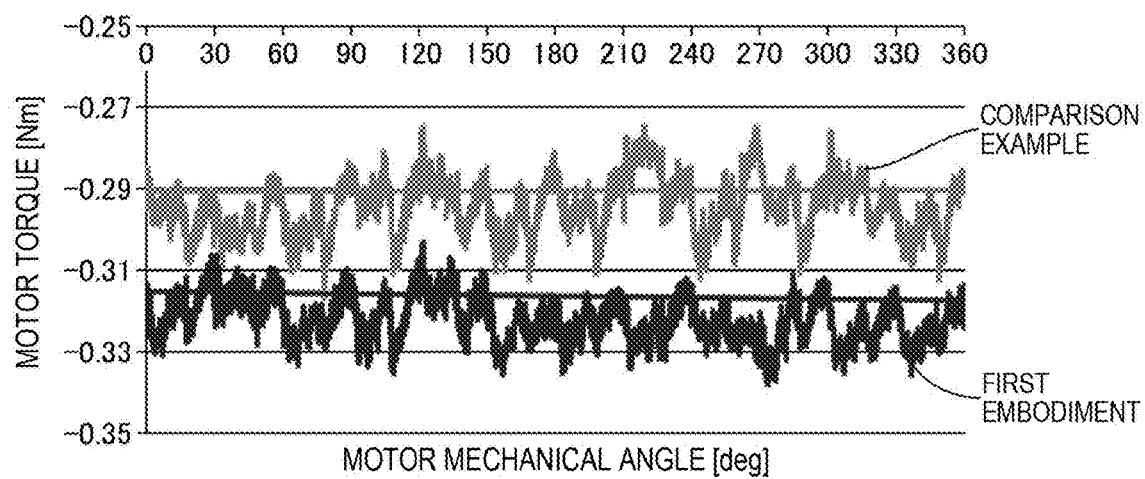
FIG. 12 (i) illustrates the relationship between a motor mechanical angle and a motor torque, and FIG. 12 (ii) illustrates the relationship between a motor rotational order and a torque ripple ratio based on an FFT analysis.
Figure 12:
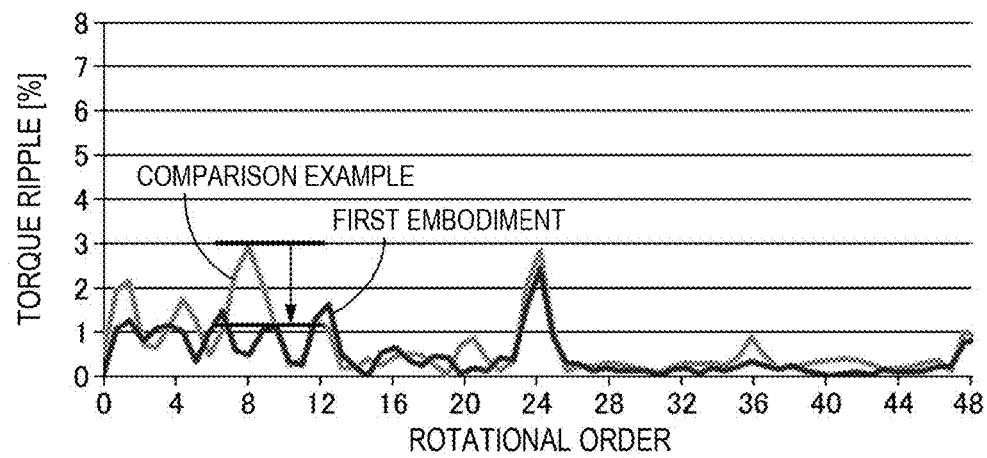

In the single-shunt current detection method, the current ripple is generated in the minimum phase current at the first detection timing, and the current ripple is generated in the maximum phase current at the second detection timing. Therefore, the motor control apparatus can suppress the current ripples generated at both the detection timings by setting the offset correction values for correcting the phase currents for the minimum phase and the maximum phase, respectively. As a result, the motor control apparatus can reduce the torque ripple and realize smooth motor driving even when the phase difference is generated in the current ripple along with the pulse shift between the two systems. FIG. 12(i) illustrates the relationship between the motor mechanical angle and the motor torque, and FIG. 12 (ii) illustrates the relationship between a motor rotational order and a torque ripple ratio resulting from an FFT analysis (fast Fourier transform) on FIG. 12 (i). FIG. 12 illustrate an example when the phase currents are corrected with use of a single offset correction value as a comparative example to the first embodiment. FIG. 12 reveal that the eighth component of the rotational order reduces by half in the first embodiment compared to the comparative example. As a result, the motor control apparatus according to the first embodiment allows the electric power steering apparatus to prevent the steering performance from being impaired and make the driver feel less uncomfortable.

The maximum phase correction table 57 and the minimum phase correction table 58 store the maximum phase offset correction values Ivumax and Iwumax when the maximum phase current is the u phase, the minimum phase offset correction values Iuvmin and Iuwmin when the minimum phase current is the u phase, the maximum phase offset correction values Iuvmax and Iwvmax when the maximum phase current is the v phase, the minimum phase offset correction values Ivumin and Ivwmin when the minimum phase current is the v phase, the maximum phase offset correction values Iuwmax and Ivwmax when the maximum phase current is the w phase, and the minimum phase offset correction values Iwumin and Iwvmin when the minimum phase current is the w phase.

In the single-shunt current detection method, the six current detection patterns occur during one rotation of the motor electric angle, and a combination of the maximum phase current and the minimum phase current is different when the current detection pattern is different. Therefore, the motor control apparatus can suppress the current ripple generated in each of the current detection patterns by setting the maximum phase offset correction value and the minimum phase offset correction value for each of the current detection patterns.

The minimum phase offset correction value Ivumin, the maximum phase offset correction value Ivumax, the minimum phase offset correction value Iwumin, the maximum phase offset correction value Iwumax, the minimum phase offset correction value Iwvmin, the maximum phase offset correction value Iwvmax, the minimum phase offset correction value Iuvmin, the maximum phase offset correction value Iuvmax, the minimum phase offset correction value Iuwmin, the maximum phase offset correction value Iuwmax, the minimum phase offset correction value Ivwmin, and the maximum phase offset correction value Ivwmax are set so as to allow the PWM duty ratio signals of the two systems to suppress the current ripple generated in the third state, the sixth state, and the ninth state, thereby reducing a vibration of the motor 11.

When the PWM carrier period Tc is different between the two systems, the above-described six current detection patterns occur during one rotation of the motor electric angle, and the third state, the sixth state, and the ninth state occupy a longer time than the other states at this time. Therefore, the motor control apparatus can acquire a further high effect of reducing the torque ripple for a long time by using the maximum phase offset correction value and the minimum phase offset correction value optimized in the third state, the sixth state, and the ninth state.

The maximum phase current and the minimum phase current are corrected based on the maximum phase offset correction value and the minimum phase offset correction value when the PWM duty ratio signals of the two systems are in the third state, the sixth state, and the ninth state.

The current ripple generated when one of the systems is driven is equal to an average value of the current ripple changing according to the time difference Δt, and this average value is an approximately equal value to the current ripple generated in the third state, the sixth state, and the ninth state. In other words, the maximum phase offset correction value and the minimum phase offset correction value according to the first embodiment can most effectively reduce the current ripple generated in the third state, the sixth state, and the ninth state. Therefore, the motor control apparatus can further reduce the torque ripple with the aid of the offset correction values suitable to suppress the current ripple by correcting the maximum phase current and the minimum phase current when the PWM duty ratio signals of the two systems are in the third state, the sixth state, and the ninth state.

The first maximum phase correction table 57a and the first minimum phase correction table 58a of the first microcomputer 21a store the first maximum phase offset correction value and the first minimum phase offset correction value, respectively, and the second maximum phase correction table 57b and the second minimum phase correction table 58b of the second microcomputer 21b store the second maximum phase offset correction value and the second minimum phase offset correction value, respectively.

The motor control apparatus can further reduce the torque ripple by using the offset correction value according to each of the first and second stator coils 23a and 23b and the first and second inverters 22a and 22b.

The first current ripple correction portion 55a continues correcting the maximum phase current and the minimum phase current even when the second inverter 22b is in the stopped state, and the second current ripple correction portion 55b continues correcting the maximum phase current and the minimum phase current even when the first inverter 22a is in the stopped state.

Therefore, even when one of the inverters 22 malfunctions due to, for example, a failure, the motor control apparatus can reduce the torque ripple, thereby realizing smooth motor driving.

Second Embodiment

A second embodiment has a basic configuration similar to the first embodiment, and therefore will be described focusing on only differences from the first embodiment.

Figure 13:
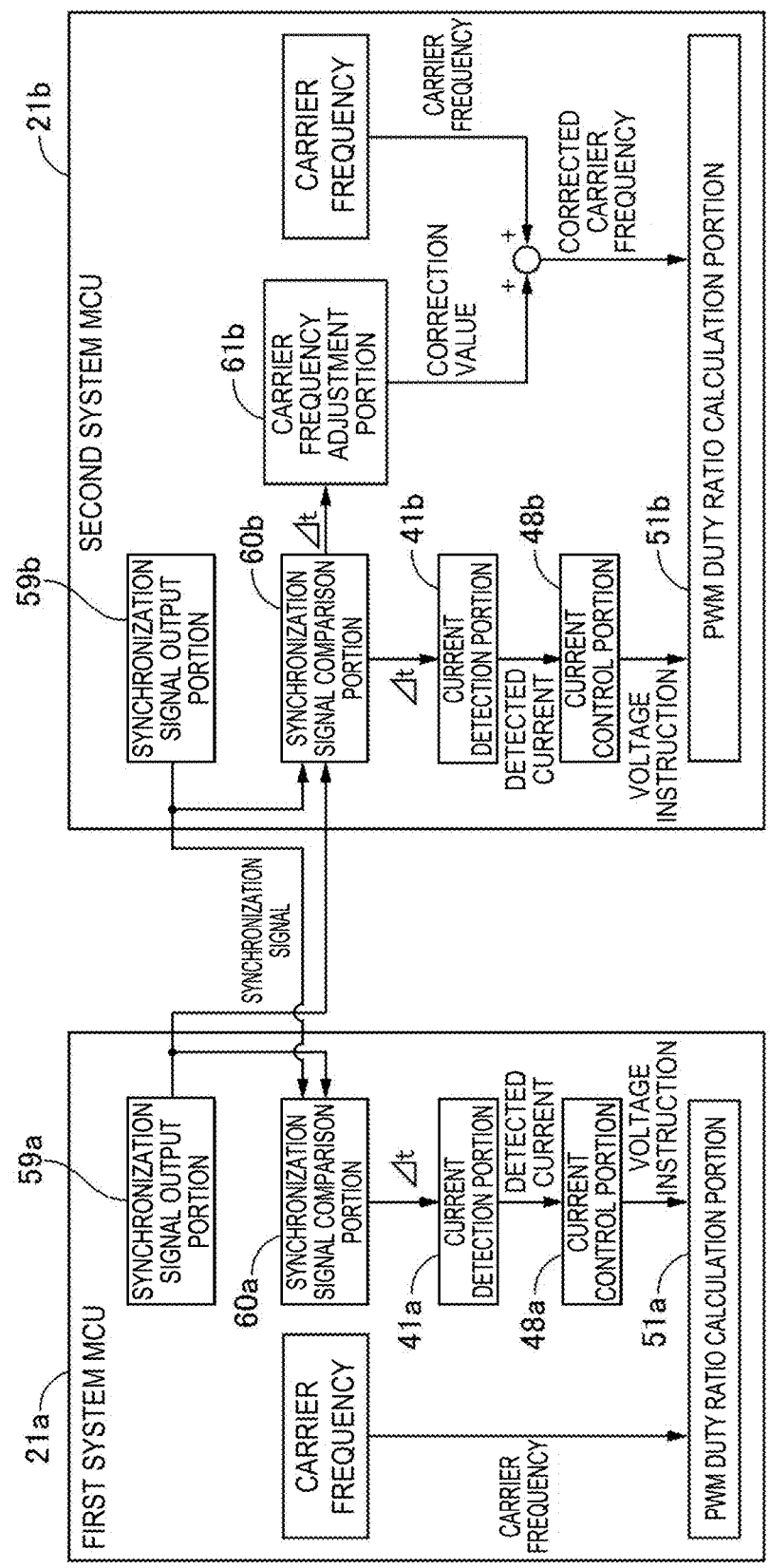
FIG. 13 illustrates the configuration of inter-microcomputer communication according to a second embodiment.

FIG. 13 illustrates the configuration of inter-microcomputer communication according to the second embodiment.

The second microcomputer 21b includes a carrier frequency adjustment portion 61b. The carrier frequency adjustment portion 61b changes the PWM carrier period Tc of the second system according to the time difference Δt between the High/Low switching positions of the two synchronization signals, thereby keeping constant the phase misalignment of the PWM carrier period between the two systems.

Figure 14:
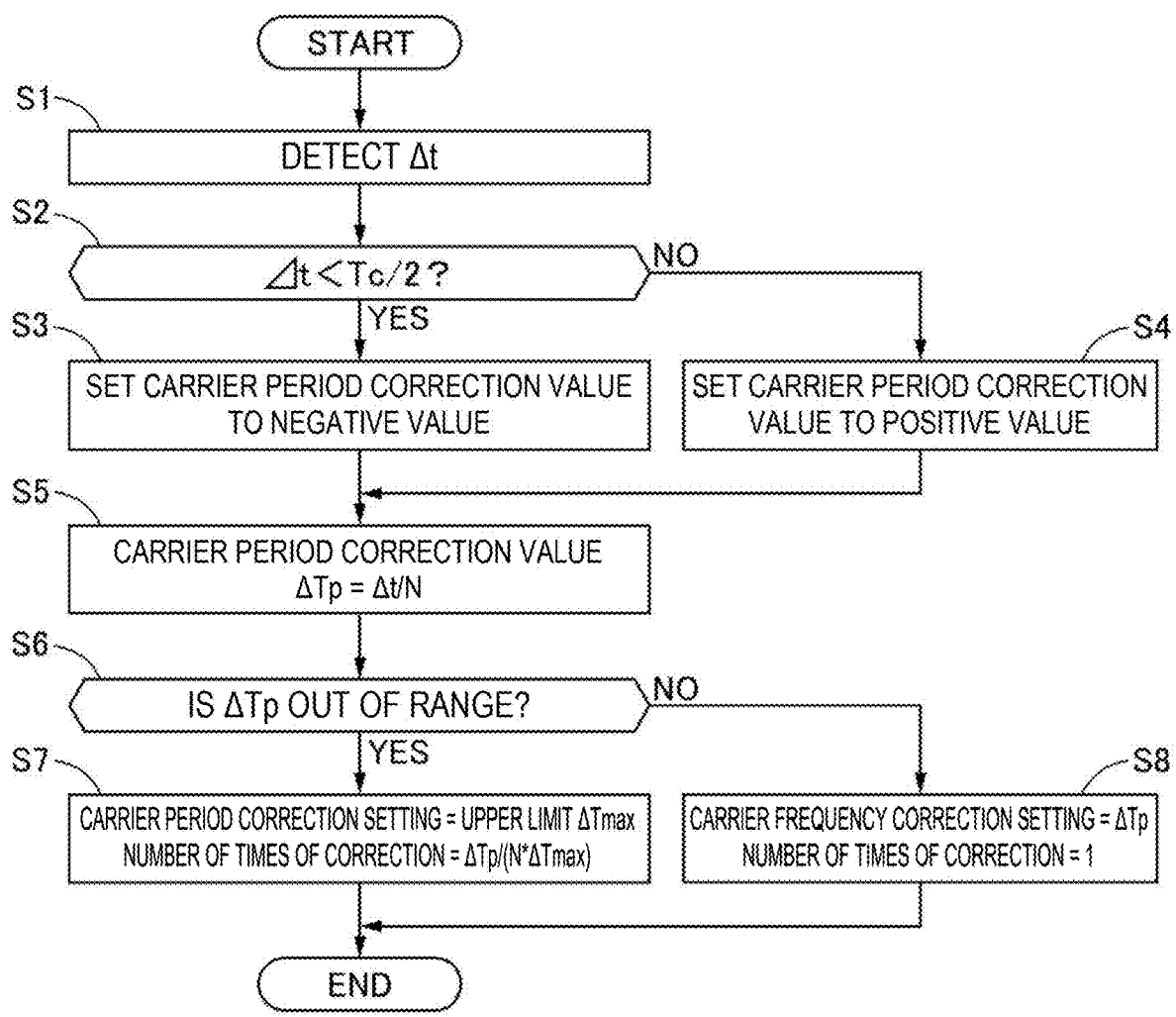
FIG. 14 is a flowchart illustrating a flow of control on phase misalignment of the PWM carrier period according to the second embodiment.

FIG. 14 is a flowchart illustrating a flow of control on the phase misalignment of the PWM carrier period according to the second embodiment.

In step S1, the motor control apparatus detects the time difference Δt between the High/Low switching signals of the synchronization signals.

In step S2, the motor control apparatus determines whether the time difference Δt is smaller than a half of the PWM carrier period Tc. If the determination in step S2 is YES, the processing proceeds to step S3. If the determination in step S2 is NO, the processing proceeds to step S4.

In step S3, the motor control apparatus sets a carrier period correction value ΔTp for correcting the PWM carrier period Tc to a negative value.

In step S4, the motor control apparatus sets the carrier period correction value ΔTp to a positive value.

In step S5, the motor control apparatus determines the carrier period correction value ΔTp according to the time difference Δt. The carrier period correction value ΔTp is set to a value acquired by dividing the time difference Δt by N (an integer) used when the synchronization signal is generated.

In step S6, the motor control apparatus determines whether the carrier period correction value ΔTp is out of range by determining whether the carrier period correction value ΔTp is equal to or smaller than a preset upper limit value ΔTmax. If the determination in step S6 is YES, the processing proceeds to step S7. If the determination in step S6 is NO, the processing proceeds to step S8.

In step S7, the motor control apparatus sets the carrier period correction value ΔTp to the upper limit value ΔTmax, and determines the number of times of the correction with use of the following equation.

the number of times of the correction=$\Delta Tp/(N \times \Delta Tmax)$

In step S8, the motor control apparatus sets the carrier period correction value ΔTp to the value determined in step S5, and determines that the number of times of the correction is one.

In this manner, in the second embodiment, the motor control apparatus corrects the PWM carrier period Tc of the second system so as to keep constant the phase misalignment of the PWM carrier period between the two systems, thereby allowing the motor 11 to be driven so as to keep the state of the phase misalignment of the PWM duty ratio signal between the same phases of the two systems in the third state, the sixth state, or the ninth state.

Therefore, the motor control apparatus can maintain the driving states of the inverters 22 suitable for the offset correction values, thereby acquiring a further high effect of reducing the torque ripple.

Third Embodiment

A third embodiment has a basic configuration similar to the first embodiment, and therefore will be described focusing on only differences from the first embodiment.

FIG. 15(i) illustrates the settings of the offset correction values according to the time difference Δt in the "vu detection" and "uv detection" patterns, and FIG. 15(ii) illustrates the settings of the offset correction values according to the time difference Δt in the "wu detection", "wv detection", "uw detection", and "vw detection" patterns.

The first maximum phase correction table 57a and the first minimum phase correction table 58a store the maximum phase offset correction value and the minimum phase offset correction value according to the time difference Δt, respectively. The current ripple according to the time difference Δt is determined in each of the current detection patterns based on an experiment or a simulation, and the maximum phase offset correction value and the minimum phase offset correction value according to the time difference Δt are set to values for eliminating this current ripple. Therefore, the maximum phase offset correction value and the minimum phase offset correction value change according to the state of the phase misalignment of the PWM duty ratio signal between the same phases of the two systems, and the first current ripple correction portion 55a corrects the maximum phase current and the minimum phase current regardless of the states of the PWM duty ratio signals of the two systems.

The minimum phase offset correction value Ivumina in the "vu detection" pattern includes a first timing matching minimum phase offset correction value Ivumina1 for correcting the minimum phase current when the phase misalignment is in the fourth state and a first half-period misalignment minimum phase offset correction value Ivumina2 for correcting the minimum phase current when the phase misalignment is in the fifth state. The maximum phase offset correction value Ivumaxa in the "vu detection" pattern includes a first timing matching maximum phase offset correction value Ivumaxa1 for correcting the maximum phase current when the phase misalignment is in the first state and a first half-period misalignment maximum phase offset correction value Ivumaxa2 for correcting the maximum phase current when the phase misalignment is in the second state.

The minimum phase offset correction value Iwumina in the "wu detection" pattern includes a first timing matching minimum phase offset correction value Iwumina1 for correcting the minimum phase current when the phase misalignment is in the seventh state and a first half-period misalignment minimum phase offset correction value Iwumina2 for correcting the minimum phase current when the phase misalignment is in the eighth state. The maximum phase offset correction value Iwumaxa in the "wu detection" pattern includes a first timing matching maximum phase offset correction value Iwumaxa1 for correcting the maximum phase current when the phase misalignment is in the first state and a first half-period misalignment maximum phase offset correction value Iwumaxa2 for correcting the maximum phase current when the phase misalignment is in the second state.

The minimum phase offset correction value Iwvmina in the "wv detection" pattern includes a first timing matching minimum phase offset correction value Iwvmina1 for correcting the minimum phase current when the phase misalignment is in the seventh state and a first half-period misalignment minimum phase offset correction value Iwvmina2 for correcting the minimum phase current when the phase misalignment is in the eighth state. The maximum phase offset correction value Iwvmaxa in the "wv detection" pattern includes a first timing matching maximum phase offset correction value Iwvmaxa1 for correcting the maximum phase current when the phase misalignment is in the fourth state and a first half-period misalignment maximum phase offset correction value Iwvmaxa2 for correcting the maximum phase current when the phase misalignment is in the fifth state.

The minimum phase offset correction value Iuvmina in the "uv detection" pattern includes a first timing matching minimum phase offset correction value Iuvmina1 for correcting the minimum phase current when the phase misalignment is in the first state and a first half-period misalignment minimum phase offset correction value Iuvmina2 for correcting the minimum phase current when the phase misalignment is in the second state. The maximum phase offset correction value Iuvmaxa in the "uv detection" pattern includes a first timing matching maximum phase offset correction value Iuvmaxa1 for correcting the maximum phase current when the phase misalignment is in the fourth state and a first half-period misalignment maximum phase offset correction value Iuvmaxa2 for correcting the maximum phase current when the phase misalignment is in the fifth state.

The minimum phase offset correction value Iuwmina in the "uw detection" pattern includes a first timing matching minimum phase offset correction value Iuwmina1 for correcting the minimum phase current when the phase misalignment is in the first state and a first half-period misalignment minimum phase offset correction value Iuwmina2 for correcting the minimum phase current when the phase misalignment is in the second state. The maximum phase offset correction value Iuwmaxa in the "uw detection" pattern includes a first timing matching maximum phase offset correction value Iuwmaxa1 for correcting the maximum phase current when the phase misalignment is in the seventh state and a first half-period misalignment maximum phase offset correction value Iuwmaxa2 for correcting the maximum phase current when the phase misalignment is in the eighth state.

The minimum phase offset correction value Ivwmina in the "vw detection" pattern includes a first timing matching minimum phase offset correction value Ivwmina1 for correcting the minimum phase current when the phase misalignment is in the fourth state and a first half-period misalignment minimum phase offset correction value Ivwmina2 for correcting the minimum phase current when the phase misalignment is in the fifth state. The maximum phase offset correction value Ivwmaxa in the "vw detection" pattern includes a first timing matching maximum phase offset correction value Ivwmaxa1 for correcting the maximum phase current when the phase misalignment is in the seventh state and a first half-period misalignment maximum phase offset correction value Ivwmaxa2 for correcting the maximum phase current when the phase misalignment is in the eighth state.

In the third embodiment, the motor control apparatus corrects the maximum phase current and the minimum phase current with use of the maximum phase offset correction value and the minimum phase offset correction value according to the state of the phase misalignment of the PWM duty ratio signal between the same phases of the two systems.

As a result, the motor control apparatus can reduce the torque ripple in a further wide range of the driving state of the motor 11.

Fourth Embodiment

A fourth embodiment has a basic configuration similar to the first embodiment, and therefore will be described focusing on only differences from the first embodiment.

In the fourth embodiment, the maximum phase offset correction value and the minimum phase offset correction value are set to values on lines drawn at average positions of the characteristic of the maximum phase offset correction value and the minimum phase offset correction value illustrated in FIGS. 15, respectively. As a result, the motor control apparatus can minimize the difference between the offset correction value required to eliminate the current ripple and the set offset correction value, thereby reducing the torque ripple. Further, the motor control apparatus allows the maximum phase offset correction value and the minimum phase offset correction value to match the offset correction values required to eliminate the current ripple in the third state, the sixth state, and the ninth state, thereby being able to acquire a further high effect of reducing the torque ripple for a long time.

Fifth Embodiment

A fifth embodiment has a basic configuration similar to the first embodiment, and therefore will be described focusing on only differences from the first embodiment.

In the fifth embodiment, a PWM carrier period (a first frequency) Ts1 of the first microcomputer 21a and a PWM carrier period Ts2 of the second microcomputer 21b are different from each other. The first microcomputer 21a controls the driving of the first inverter 22a according to the PWM carrier period Ts1, and the second microcomputer 21b controls the driving of the second inverter 22b according to the PWM carrier period Ts2. Due to this control, the motor control apparatus can easily cause misalignment of the phase of the PWM duty ratio signal between the same phases of the two systems, thereby facilitating the occurrence of the third state, the sixth state, or the ninth state and thus acquiring a further high effect of reducing the torque ripple.

Sixth Embodiment

A sixth embodiment has a basic configuration similar to the first embodiment, and therefore will be described focusing on only differences from the first embodiment.

In the sixth embodiment, the first microcomputer 21a and the second microcomputer 21b are not synchronized via the inter-microcomputer communication. The first microcomputer 21a controls the driving of the first inverter 22a based on a first clock signal, which is a clock signal of the first microcomputer 21a, and the second microcomputer 21b controls the driving of the second inverter 22b based on a second clock signal, which is a clock signal of the second microcomputer 21b. The motor control apparatus causes the first microcomputer 21a and the second microcomputer 21b to control the driving independently without being synchronized with each other, thereby causing a difference between the timings of driving the first inverter 22a and the second inverter 22b. As a result, the motor control apparatus can easily cause misalignment of the phase of the PWM duty ratio signal between the same phases of the two systems, thereby facilitating the occurrence of the third state, the sixth state, or the ninth state and thus acquiring a further high effect of reducing the torque ripple.

OTHER EMBODIMENTS

Having described the embodiments for implementing the present invention, the specific configuration of the present invention is not limited to the configuration of the embodiments, and the present invention also includes even a design modification and the like thereof made within a range that does not depart from the spirit of the present invention, if any.

The motor control apparatus according to the present invention may be configured in a different manner as long as the driving circuit and the stator coil are redundantly configured, and may include one microcomputer.

The current sensor may be provided in the upstream-side first direct-current bus.

In the following description, technical ideas recognizable from the above-described embodiments will be described.

A motor control apparatus, in one configuration thereof, is configured to control a three-phase brushless motor. The three-phase brushless motor includes a motor rotor, a first stator coil including a first u phase, a first v phase, and a first w phase, and a second stator coil including a second u phase, a second v phase, and a second w phase. The motor control apparatus includes a first driving circuit including a first bridge circuit including a first inverter. The first driving circuit is configured to control driving of the first inverter based on a first u phase duty ratio signal, a first v phase duty ratio signal, or a first w phase duty ratio signal to control power to be supplied to the first stator coil. The motor control apparatus further includes a second driving circuit including a second bridge circuit including a second inverter. The second driving circuit is configured to control driving of the second inverter based on a second u phase duty ratio signal, a second v phase duty ratio signal, or a second w phase duty ratio signal to control power to be supplied to the second stator coil. The motor control apparatus further includes a first current sensor configured to detect a first direct-current bus current flowing in a first direct-current bus of the first driving circuit and output it as a first detected current signal, a second current sensor configured to detect a second direct-current bus current flowing in a second direct-current bus of the second driving circuit and output it as a second detected current signal, and a microcomputer including an instruction current generation portion, a current control portion, a PWM duty ratio signal generation portion, a first detected current correction portion, a second detected current correction portion, and an offset correction value storage portion. The instruction current generation portion generates a first instruction signal for controlling driving of the three-phase brushless motor. The current control portion includes a first current control portion and a second current control portion. The first current control portion generates a first second instruction signal based on the first instruction signal, a first u phase detected current signal, a first v phase detected current signal, and a first w phase detected current signal. The second current control portion generates a second second instruction signal based on the first instruction signal, a second u phase detected current signal, a second v phase detected current signal, and a second w phase detected current signal. The PWM duty ratio signal generation portion includes a first PWM duty ratio signal generation portion and a second PWM duty ratio signal generation portion. The first PWM duty ratio signal generation portion generates the first a phase duty ratio signal, the first v phase duty ratio signal, or the first w phase duty ratio signal based on the first second instruction current signal. The first u phase duty ratio signal, the first v phase duty ratio signal, and the first w phase duty ratio signal are signals of duty ratios with respect to the first u phase, the first v phase, and the first w phase, respectively. The second PWM duty ratio signal generation portion generates the second u phase duty ratio signal, the second v phase duty ratio signal, or the second w phase duty ratio signal based on the second second instruction current signal. The second u phase duty ratio signal, the second v phase duty ratio signal, and the second w phase duty ratio signal are signals of duty ratios with respect to the second u phase, the second v phase, and the second w phase, respectively. The first detected current correction portion generates the first a phase detected current signal, the first v phase detected current signal, or the first w phase detected current signal by correcting a first u phase detected current, a first v phase detected current, or a first w phase detected current based on a maximum phase offset correction value or a minimum phase offset correction value. The first u phase detected current, the first v phase detected current, and the first w phase detected current are currents corresponding to currents generated based on the first detected current signal and flowing in the first u phase, the first v phase, and the first w phase, respectively. The second detected current correction portion generates the second u phase detected current signal, the second v phase detected current signal, or the second w phase detected current signal by correcting a second u phase detected current, a second v phase detected current, or a second w phase detected current based on the maximum phase offset correction value or the minimum phase offset correction value. The second u phase detected current, the second v phase detected current, and the second w phase detected current are currents corresponding to currents generated based on the second detected current signal and flowing in the second u phase, the second v phase, and the second w phase, respectively. The offset correction value storage portion stores the maximum phase offset correction value and the minimum phase offset correction value. Assuming that a first maximum phase duty ratio signal and a first minimum phase duty ratio signal are a duty ratio signal for which power is supplied for a longest time and a duty ratio signal for which power is supplied for a shortest time among the first u phase duty ratio signal, the first v phase duty ratio signal, and the first w phase duty ratio signal, respectively, and a first maximum phase and a first minimum phase are a phase in which the first maximum phase duty ratio signal flows and a phase in which the first minimum phase duty ratio signal flows among the first u phase, the first v phase, and the first w phase, respectively, assuming that a first maximum phase detected current and a first minimum phase detected current are a detected current corresponding to the first maximum phase and a detected current corresponding to the first minimum phase among the first u phase detected current, the first v phase detected current, and the first w phase detected current, respectively, assuming that a second maximum phase duty ratio signal and a second minimum phase duty ratio signal are a duty ratio signal for which power is supplied for a longest time and a duty ratio signal for which power is supplied for a shortest time among the second u phase duty ratio signal, the second v phase duty ratio signal, and the second w phase duty ratio signal, respectively, and a second maximum phase and a second minimum phase are a phase in which the second maximum phase duty ratio signal flows and a phase in which the second minimum phase duty ratio signal flows among the second u phase, the second v phase, and the second w phase, respectively, and assuming that a second maximum phase detected current and a second minimum phase detected current are a detected current corresponding to the second maximum phase and a detected current corresponding to the second minimum phase among the second u phase detected current, the second v phase detected current, and the second w phase detected current, respectively, the maximum phase offset correction value corrects the first maximum phase detected current and the second maximum phase detected current, and the minimum phase offset correction value corrects the first minimum phase detected current and the second minimum phase detected current.

According to a further preferable configuration, in the above-described configuration, the offset correction value storage portion stores a first u phase maximum phase offset correction value used when the first u phase is the first maximum phase, a first v phase maximum phase offset correction value used when the first v phase is the first maximum phase, a first w phase maximum phase offset correction value used when the first w phase is the first maximum phase, a second u phase maximum phase offset correction value used when the second u phase is the second maximum phase, a second v phase maximum phase offset correction value used when the second v phase is the second maximum phase, and a second w phase maximum phase offset correction value used when the second w phase is the second maximum phase, as the maximum phase offset correction value, and stores a first u phase minimum phase offset correction value used when the first u phase is the first minimum phase, a first v phase minimum phase offset correction value used when the first v phase is the first minimum phase, a first w phase minimum phase offset correction value used when the first w phase is the first minimum phase, a second u phase minimum phase offset correction value used when the second u phase is the second minimum phase, a second v phase minimum phase offset correction value used when the second v phase is the second minimum phase, and a second w phase minimum phase offset correction value used when the second w phase is the second minimum phase, as the minimum phase offset correction value.

According to another preferable configuration, in any of the above-described configurations, the first u phase maximum phase offset correction value, the second u phase maximum phase offset correction value, the first u phase minimum phase offset correction value, and the second u phase minimum phase offset correction value are set so as to reduce a vibration of the three-phase brushless motor in a third state that is neither a first state nor a second state. The first state is a state in which the first u phase duty ratio signal is switched from a Low state to a High state and the second u phase duty ratio signal is switched from the Low state to the High state at the same timing. The second state is a state in which the first u phase duty ratio signal is switched from the Low state to the High state and the second u phase duty ratio signal is switched from the Low state to the High state at timings different from each other by a half period. The first v phase maximum phase offset correction value, the second v phase maximum phase offset correction value, the first v phase minimum phase offset correction value, and the second v phase minimum phase offset correction value are set so as to reduce the vibration of the three-phase brushless motor in a sixth state that is neither a fourth state nor a fifth state. The fourth state is a state in which the first v phase duty ratio signal is switched from the Low state to the High state and the second v phase duty ratio signal is switched from the Low state to the High state at the same timing. The fifth state is a state in which the first v phase duty ratio signal is switched from the Low state to the High state and the second v phase duty ratio signal is switched from the Low state to the High state at timings different from each other by a half period. The first w phase maximum phase offset correction value, the second w phase maximum phase offset correction value, the first w phase minimum phase offset correction value, and the second w phase minimum phase offset correction value are set so as to reduce the vibration of the three-phase brushless motor in a ninth state that is neither a seventh state nor an eighth state. The seventh state is a state in which the first w phase duty ratio signal is switched from the Low state to the High state and the second w phase duty ratio signal is switched from the Low state to the High state at the same timing. The eighth state is a state in which the first w phase duty ratio signal is switched from the Low state to the High state and the second w phase duty ratio signal is switched from the Low state to the High state at timings different from each other by a half period.

According to further another preferable configuration, in any of the above-described configurations, the microcomputer includes a first microcomputer and a second microcomputer. The instruction current generation portion includes a first instruction current generation portion and a second instruction current generation portion. The offset correction value storage portion includes a first offset correction value storage portion and a second offset correction value storage portion. The first microcomputer includes the first instruction current generation portion, the first current control portion, the first PWM duty ratio signal generation portion, the first detected current correction portion, the first offset correction value storage portion, a first inter-microcomputer communication portion, and a first offset correction value selection portion. The second microcomputer includes the second instruction current generation portion, the second current control portion, the second PWM duty ratio signal generation portion, the second detected current correction portion, the second offset correction value storage portion, a second inter-microcomputer communication portion, and a second offset correction value selection portion. The first inter-microcomputer communication portion acquires information about the second microcomputer that is transmitted from the second inter-microcomputer communication portion. The second inter-microcomputer communication portion acquires information about the first microcomputer that is transmitted from the first inter-microcomputer communication portion. The first offset correction value selection portion selects the first u phase maximum phase offset correction value, the first v phase maximum phase offset correction value, or the first w phase maximum phase offset correction value as the maximum phase offset correction value and selects the first u phase minimum phase offset correction value, the first v phase minimum phase offset correction value, or the first w phase minimum phase offset correction value as the minimum phase offset correction value when driving states of the first driving circuit and the second driving circuit are in the third state, the sixth state, or the ninth state based on the information about the second microcomputer. The second offset correction value selection portion selects the second u phase maximum phase offset correction value, the second v phase maximum phase offset correction value, or the second w phase maximum phase offset correction value as the maximum phase offset correction value and selects the second u phase minimum phase offset correction value, the second v phase minimum phase offset correction value, or the second w phase minimum phase offset correction value as the minimum phase offset correction value when the driving states of the first driving circuit and the second driving circuit are in the third state, the sixth state, or the ninth state based on the information about the first microcomputer.

According to further another preferable configuration, in any of the above-described configurations, the first offset correction value storage portion stores a first timing matching maximum phase offset correction value for correcting the first maximum phase detected current as the maximum phase offset correction value when the driving states of the first driving circuit and the second driving circuit are in the first state, the fourth state, or the seventh state, stores a first half-period misalignment maximum phase offset correction value for correcting the first maximum phase detected current as the maximum phase offset correction value when the driving states of the first driving circuit and the second driving circuit are in the second state, the fifth state, or the eighth state, stores a first timing matching minimum phase offset correction value for correcting the first minimum phase detected current as the minimum phase offset correction value when the driving states of the first driving circuit and the second driving circuit are in the first state, the fourth state, or the seventh state, and stores a first half-period misalignment minimum phase offset correction value for correcting the first minimum phase detected current as the minimum phase offset correction value when the driving states of the first driving circuit and the second driving circuit are in the second state, the fifth state, or the eighth state. The second offset correction value storage portion stores a second timing matching maximum phase offset correction value for correcting the second maximum phase detected current as the maximum phase offset correction value when the driving states of the first driving circuit and the second driving circuit are in the first state, the fourth state, or the seventh state, stores a second half-period misalignment maximum phase offset correction value for correcting the second maximum phase detected current as the maximum phase offset correction value when the driving states of the first driving circuit and the second driving circuit are in the second state, the fifth state, or the eighth state, stores a second timing matching minimum phase offset correction value for correcting the second minimum phase detected current as the minimum phase offset correction value when the driving states of the first driving circuit and the second driving circuit are in the first state, the fourth state, or the seventh state, and stores a second half-period misalignment minimum phase offset correction value for correcting the second minimum phase detected current as the minimum phase offset correction value when the driving states of the first driving circuit and the second driving circuit are in the second state, the fifth state, or the eighth state. The first offset correction value selection portion selects the first timing matching maximum phase offset correction value as the maximum phase offset correction value and selects the first timing matching minimum phase offset correction value as the minimum phase offset correction value when the driving states of the first driving circuit and the second driving circuit are in the first state, the fourth state, or the seventh state, and selects the first half-period misalignment maximum phase offset correction value as the maximum phase offset correction value and selects the first half-period misalignment minimum phase offset correction value as the minimum phase offset correction value when the driving states of the first driving circuit and the second driving circuit are in the second state, the fifth state, or the eighth state based on the information about the second microcomputer. The second offset correction value selection portion selects the second timing matching maximum phase offset correction value as the maximum phase offset correction value and selects the second timing matching minimum phase offset correction value as the minimum phase offset correction value when the driving states of the first driving circuit and the second driving circuit are in the first state, the fourth state, or the seventh state, and selects the second half-period misalignment maximum phase offset correction value as the maximum phase offset correction value and selects the second half-period misalignment minimum phase offset correction value as the minimum phase offset correction value when the driving states of the first driving circuit and the second driving circuit are in the second state, the fifth state, or the eighth state based on the information about the first microcomputer.

According to further another preferable configuration, in any of the above-described configurations, the microcomputer includes a first microcomputer and a second microcomputer. The instruction current generation portion includes a first instruction current generation portion and a second instruction current generation portion. The offset correction value storage portion includes a first offset correction value storage portion and a second offset correction value storage portion. The first microcomputer includes the first instruction current generation portion, the first current control portion, the first PWM duty ratio signal generation portion, the first detected current correction portion, the first offset correction value storage portion, and a first inter-microcomputer communication portion. The second microcomputer includes the second instruction current generation portion, the second current control portion, the second PWM duty ratio signal generation portion, the second detected current correction portion, the second offset correction value storage portion, and a second inter-microcomputer communication portion. The first inter-microcomputer communication portion acquires information about the second microcomputer that is transmitted from the second inter-microcomputer communication portion. The second inter-microcomputer communication portion acquires information about the first microcomputer that is transmitted from the first inter-microcomputer communication portion. The first instruction current generation portion generates the first instruction signal so as to maintain the third state, the sixth state, or the ninth state based on the information about the second microcomputer. The second instruction current generation portion generates the first instruction signal so as to maintain the third state, the sixth state, or the ninth state based on the information about the first microcomputer.

According to further another preferable configuration, in any of the above-described configurations, the microcomputer controls the driving of the first driving circuit with a first frequency, and controls the driving of the second driving circuit with a second frequency different from the first frequency.

According to further another preferable configuration, in any of the above-described configurations, the microcomputer includes a first microcomputer and a second microcomputer. The instruction current generation portion includes a first instruction current generation portion and a second instruction current generation portion. The offset correction value storage portion includes a first offset correction value storage portion and a second offset correction value storage portion. The first microcomputer includes the first instruction current generation portion, the first current control portion, the first PWM duty ratio signal generation portion, the first detected current correction portion, and the first offset correction value storage portion. The second microcomputer includes the second instruction current generation portion, the second current control portion, the second PWM duty ratio signal generation portion, the second detected current correction portion, and the second offset correction value storage portion. The first microcomputer controls the driving of the first driving circuit based on a first clock signal. The first clock signal is a clock signal of the first microcomputer. The second microcomputer controls the driving of the second driving circuit based on a second clock signal. The second clock signal is a clock signal of the second microcomputer.

According to further another preferable configuration, in any of the above-described configurations, the microcomputer includes a first microcomputer and a second microcomputer. The instruction current generation portion includes a first instruction current generation portion and a second instruction current generation portion. The offset correction value storage portion includes a first offset correction value storage portion and a second offset correction value storage portion. The first microcomputer includes the first instruction current generation portion, the first current control portion, the first PWM duty ratio signal generation portion, the first detected current correction portion, and the first offset correction value storage portion. The second microcomputer includes the second instruction current generation portion, the second current control portion, the second PWM duty ratio signal generation portion, the second detected current correction portion, and the second offset correction value storage portion. The first offset correction value storage portion stores a first maximum phase offset correction value as the maximum phase offset correction value and stores a first minimum phase offset correction value as the minimum phase offset correction value. The second offset correction value storage portion stores a second maximum phase offset correction value as the maximum phase offset correction value and stores a second minimum phase offset correction value as the minimum phase offset correction value.

According to further another preferable configuration, in any of the above-described configurations, the first detected current correction portion generates the first u phase detected current signal, the first v phase detected current signal, or the first w phase detected current signal by correcting the first u phase detected current, the first v phase detected current, or the first w phase detected current based on the maximum phase offset correction value or the minimum phase offset correction value even when the second driving circuit is in a stopped state. The second detected current correction portion generates the second u phase detected current signal, the second v phase detected current signal, or the second w phase detected current signal by correcting the second u phase detected current, the second v phase detected current, or the second w phase detected current based on the maximum phase offset correction value or the minimum phase offset correction value even when the first driving circuit is in a stopped state.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-008287 filed on Jan. 22, 2019. The entire disclosure of Japanese Patent Application No. 2019-008287 filed on Jan. 22, 2019 including the specification, the claims, the drawings, and the abstract is incorporated herein by reference in its entirety.

REFERENCE SIGNS LIST 11 three-phase brushless motor
21*a* first microcomputer
21*b* second microcomputer
22*a* first inverter (first driving circuit)
22*b* second inverter (second driving circuit)
23*a* first stator coil
23*b* second stator coil
24 motor rotor
34*a* first current sensor
34*b* second current sensor
38*a* downstream-side first direct-current bus (first direct-current bus)
38*b* downstream-side second direct-current bus (second direct-current bus)
48*a* first current control portion
48*b* second current control portion
51*a* first PWM duty ratio calculation portion (first PWM duty ratio signal generation portion)
51*b* second PWM duty ratio calculation portion (second PWM duty ratio signal generation portion)
54*a* first instruction current generation portion
54*b* first instruction current generation portion
55*a* first current rippler correction portion (first detected current correction portion)
55*b* second current rippler correction portion (second detected current correction portion)
56*a* first offset correction value selection portion
56*b* second offset correction value selection portion
57*a* first maximum phase correction table (first offset correction value storage portion)
57*b* second maximum phase correction table (second offset correction value storage portion)
58*a* first minimum phase correction table (first offset correction value storage portion)
58*b* second minimum phase correction table (second offset correction value storage portion)
59*a* first synchronization signal output portion (first inter-microcomputer communication portion)
59*b* second synchronization signal output portion (second inter-microcomputer communication portion)
60*a* first synchronization signal comparison portion (first inter-microcomputer communication portion)
60*b* second synchronization signal comparison portion (second inter-microcomputer communication portion)

The invention claimed is:

1. A motor control apparatus configured to control a three-phase brushless motor, the three-phase brushless motor including a motor rotor, a first stator coil including a first u phase, a first v phase, and a first w phase, and a second stator coil including a second u phase, a second v phase, and a second w phase, the motor control apparatus comprising:
   a first driving circuit including a first bridge circuit including a first inverter, the first driving circuit being configured to control driving of the first inverter based on a first u phase duty ratio signal, a first v phase duty ratio signal, or a first w phase duty ratio signal to control power to be supplied to the first stator coil;
   a second driving circuit including a second bridge circuit including a second inverter, the second driving circuit being configured to control driving of the second inverter based on a second u phase duty ratio signal, a second v phase duty ratio signal, or a second w phase duty ratio signal to control power to be supplied to the second stator coil;
   a first current sensor configured to detect a first direct-current bus current flowing in a first direct-current bus of the first driving circuit and output it as a first detected current signal;
   a second current sensor configured to detect a second direct-current bus current flowing in a second direct-current bus of the second driving circuit and output it as a second detected current signal; and a microcomputer including an instruction current generation portion, a current control portion, a PWM duty ratio signal generation portion, a first detected current correction portion, a second detected current correction portion, and an offset correction value storage portion, wherein the instruction current generation portion generates a first instruction signal for controlling driving of the three-phase brushless motor, wherein the current control portion includes a first current control portion and a second current control portion, wherein the first current control portion generates a first second instruction signal based on the first instruction signal, a first u phase detected current signal, a first v phase detected current signal, and a first w phase detected current signal, wherein the second current control portion generates a second second instruction signal based on the first instruction signal, a second u phase detected current signal, a second v phase detected current signal, and a second w phase detected current signal, wherein the PWM duty ratio signal generation portion includes a first PWM duty ratio signal generation portion and a second PWM duty ratio signal generation portion, wherein the first PWM duty ratio signal generation portion generates the first u phase duty ratio signal, the first v phase duty ratio signal, or the first w phase duty ratio signal based on the first second instruction current signal, the first u phase duty ratio signal, the first v phase duty ratio signal, and the first w phase duty ratio signal being signals of duty ratios with respect to the first u phase, the first v phase, and the first w phase, respectively, wherein the second PWM duty ratio signal generation portion generates the second u phase duty ratio signal, the second v phase duty ratio signal, or the second w phase duty ratio signal based on the second second instruction current signal, the second u phase duty ratio signal, the second v phase duty ratio signal, and the second w phase duty ratio signal being signals of duty ratios with respect to the second u phase, the second v phase, and the second w phase, respectively, wherein the first detected current correction portion generates the first u phase detected current signal, the first v phase detected current signal, or the first w phase detected current signal by correcting a first u phase detected current, a first v phase detected current, or a first w phase detected current based on a maximum phase offset correction value or a minimum phase offset correction value, wherein the first u phase detected current, the first v phase detected current, and the first w phase detected current are currents corresponding to currents generated based on the first detected current signal and flowing in the first a phase, the first v phase, and the first w phase, respectively, wherein the second detected current correction portion generates the second u phase detected current signal, the second v phase detected current signal, or the second w phase detected current signal by correcting a second u phase detected current, a second v phase detected current, or a second w phase detected current based on the maximum phase offset correction value or the minimum phase offset correction value, wherein the second u phase detected current, the second v phase detected current, and the second w phase detected current are currents corresponding to currents generated based on the second detected current signal and flowing in the second u phase, the second v phase, and the second w phase, respectively, wherein the offset correction value storage portion stores the maximum phase offset correction value and the minimum phase offset correction value, and wherein, assuming that a first maximum phase duty ratio signal and a first minimum phase duty ratio signal are a duty ratio signal for which power is supplied for a longest time and a duty ratio signal for which power is supplied for a shortest time among the first u phase duty ratio signal, the first v phase duty ratio signal, and the first w phase duty ratio signal, respectively, and a first maximum phase and a first minimum phase are a phase in which the first maximum phase duty ratio signal flows and a phase in which the first minimum phase duty ratio signal flows among the first u phase, the first v phase, and the first w phase, respectively, assuming that a first maximum phase detected current and a first minimum phase detected current are a detected current corresponding to the first maximum phase and a detected current corresponding to the first minimum phase among the first u phase detected current, the first v phase detected current, and the first w phase detected current, respectively, assuming that a second maximum phase duty ratio signal and a second minimum phase duty ratio signal are a duty ratio signal for which power is supplied for a longest time and a duty ratio signal for which power is supplied for a shortest time among the second u phase duty ratio signal, the second v phase duty ratio signal, and the second w phase duty ratio signal, respectively, and a second maximum phase and a second minimum phase are a phase in which the second maximum phase duty ratio signal flows and a phase in which the second minimum phase duty ratio signal flows among the second u phase, the second v phase, and the second w phase, respectively, and assuming that a second maximum phase detected current and a second minimum phase detected current are a detected current corresponding to the second maximum phase and a detected current corresponding to the second minimum phase among the second u phase detected current, the second v phase detected current, and the second w phase detected current, respectively, the maximum phase offset correction value corrects the first maximum phase detected current and the second maximum phase detected current, and the minimum phase offset correction value corrects the first minimum phase detected current and the second minimum phase detected current.

2. The motor control apparatus according to claim 1, wherein the offset correction value storage portion stores a first u phase maximum phase offset correction value used when the first u phase is the first maximum phase, a first v phase maximum phase offset correction value used when the first v phase is the first maximum phase, a first w phase maximum phase offset correction value used when the first w phase is the first maximum phase, a second u phase maximum phase offset correction value used when the second u phase is the second maximum phase, a second v phase maximum phase offset correction value used when the second v phase is the second maximum phase, and a second w phase maximum phase offset correction value used when the second w phase is the second maximum phase, as the maximum phase offset correction value, and stores a first u phase minimum phase offset correction value used when the first u phase is the first minimum phase, a first v phase minimum phase offset correction value used when the first v phase is the first minimum phase, a first w phase minimum phase offset correction value used when the first w phase is the first minimum phase, a second u phase minimum phase offset correction value used when the second u phase is the second minimum phase, a second v phase minimum phase offset correction value used when the second v phase is the second minimum phase, and a second w phase minimum phase offset correction value used when the second w phase is the second minimum phase, as the minimum phase offset correction value.

3. The motor control apparatus according to claim 2, wherein the first u phase maximum phase offset correction value, the second u phase maximum phase offset correction value, the first u phase minimum phase offset correction value, and the second u phase minimum phase offset correction value are set so as to reduce a vibration of the three-phase brushless motor in a third state that is neither a first state nor a second state, the first state being a state in which the first u phase duty ratio signal is switched from a Low state to a High state and the second u phase duty ratio signal is switched from the Low state to the High state at the same timing, the second state being a state in which the first u phase duty ratio signal is switched from the Low state to the High state and the second u phase duty ratio signal is switched from the Low state to the High state at timings different from each other by a half period, wherein the first v phase maximum phase offset correction value, the second v phase maximum phase offset correction value, the first v phase minimum phase offset correction value, and the second v phase minimum phase offset correction value are set so as to reduce the vibration of the three-phase brushless motor in a sixth state that is neither a fourth state nor a fifth state, the fourth state being a state in which the first v phase duty ratio signal is switched from the Low state to the High state and the second v phase duty ratio signal is switched from the Low state to the High state at the same timing, the fifth state being a state in which the first v phase duty ratio signal is switched from the Low state to the High state and the second v phase duty ratio signal is switched from the Low state to the High state at timings different from each other by a half period, and wherein the first w phase maximum phase offset correction value, the second w phase maximum phase offset correction value, the first w phase minimum phase offset correction value, and the second w phase minimum phase offset correction value are set so as to reduce the vibration of the three-phase brushless motor in a ninth state that is neither a seventh state nor an eighth state, the seventh state being a state in which the first w phase duty ratio signal is switched from the Low state to the High state and the second w phase duty ratio signal is switched from the Low state to the High state at the same timing, the eighth state being a state in which the first w phase duty ratio signal is switched from the Low state to the High state and the second w phase duty ratio signal is switched from the Low state to the High state at timings different from each other by a half period.

4. The motor control apparatus according to claim 3, wherein the microcomputer includes a first microcomputer and a second microcomputer, wherein the instruction current generation portion includes a first instruction current generation portion and a second instruction current generation portion, wherein the offset correction value storage portion includes a first offset correction value storage portion and a second offset correction value storage portion, wherein the first microcomputer includes the first instruction current generation portion, the first current control portion, the first PWM duty ratio signal generation portion, the first detected current correction portion, the first offset correction value storage portion, a first inter-microcomputer communication portion, and a first offset correction value selection portion, wherein the second microcomputer includes the second instruction current generation portion, the second current control portion, the second PWM duty ratio signal generation portion, the second detected current correction portion, the second offset correction value storage portion, a second inter-microcomputer communication portion, and a second offset correction value selection portion, wherein the first inter-microcomputer communication portion acquires information about the second microcomputer that is transmitted from the second inter-microcomputer communication portion, wherein the second inter-microcomputer communication portion acquires information about the first microcomputer that is transmitted from the first inter-microcomputer communication portion, wherein the first offset correction value selection portion selects the first u phase maximum phase offset correction value, the first v phase maximum phase offset correction value, or the first w phase maximum phase offset correction value as the maximum phase offset correction value and selects the first u phase minimum phase offset correction value, the first v phase minimum phase offset correction value, or the first w phase minimum phase offset correction value as the minimum phase offset correction value when driving states of the first driving circuit and the second driving circuit are in the third state, the sixth state, or the ninth state based on the information about the second microcomputer, and wherein the second offset correction value selection portion selects the second u phase maximum phase offset correction value, the second v phase maximum phase offset correction value, or the second w phase maximum phase offset correction value as the maximum phase offset correction value and selects the second u phase minimum phase offset correction value, the second v phase minimum phase offset correction value, or the second w phase minimum phase offset correction value as the minimum phase offset correction value when the driving states of the first driving circuit and the second driving circuit are in the third state, the sixth state, or the ninth state based on the information about the first microcomputer.

5. The motor control apparatus according to claim 4, wherein the first offset correction value storage portion stores a first timing matching maximum phase offset correction value for correcting the first maximum phase detected current as the maximum phase offset correction value when the driving states of the first driving circuit and the second driving circuit are in the first state, the fourth state, or the seventh state, stores a first half-period misalignment maximum phase offset correction value for correcting the first maximum phase detected current as the maximum phase offset correction value when the driving states of the first driving circuit and the second driving circuit are in the second state, the fifth state, or the eighth state, stores a first timing matching minimum phase offset correction value for correcting the first minimum phase detected current as the minimum phase offset correction value when the driving states of the first driving circuit and the second driving circuit are in the first state, the fourth state, or the seventh state, and stores a first half-period misalignment minimum phase offset correction value for correcting the first minimum phase detected current as the minimum phase offset correction value when the driving states of the first driving circuit and the second driving circuit are in the second state, the fifth state, or the eighth state,
  wherein the second offset correction value storage portion stores a second timing matching maximum phase offset correction value for correcting the second maximum phase detected current as the maximum phase offset correction value when the driving states of the first driving circuit and the second driving circuit are in the first state, the fourth state, or the seventh state, stores a second half-period misalignment maximum phase offset correction value for correcting the second maximum phase detected current as the maximum phase offset correction value when the driving states of the first driving circuit and the second driving circuit are in the second state, the fifth state, or the eighth state, stores a second timing matching minimum phase offset correction value for correcting the second minimum phase detected current as the minimum phase offset correction value when the driving states of the first driving circuit and the second driving circuit are in the first state, the fourth state, or the seventh state, and stores a second half-period misalignment minimum phase offset correction value for correcting the second minimum phase detected current as the minimum phase offset correction value when the driving states of the first driving circuit and the second driving circuit are in the second state, the fifth state, or the eighth state,
  wherein the first offset correction value selection portion selects the first timing matching maximum phase offset correction value as the maximum phase offset correction value and selects the first timing matching minimum phase offset correction value as the minimum phase offset correction value when the driving states of the first driving circuit and the second driving circuit are in the first state, the fourth state, or the seventh state, and selects the first half-period misalignment maximum phase offset correction value as the maximum phase offset correction value and selects the first half-period misalignment minimum phase offset correction value as the minimum phase offset correction value when the driving states of the first driving circuit and the second driving circuit are in the second state, the fifth state, or the eighth state based on the information about the second microcomputer, and
  wherein the second offset correction value selection portion selects the second timing matching maximum phase offset correction value as the maximum phase offset correction value and selects the second timing matching minimum phase offset correction value as the minimum phase offset correction value when the driving states of the first driving circuit and the second driving circuit are in the first state, the fourth state, or the seventh state, and selects the second half-period misalignment maximum phase offset correction value as the maximum phase offset correction value and selects the second half-period misalignment minimum phase offset correction value as the minimum phase offset correction value when the driving states of the first driving circuit and the second driving circuit are in the second state, the fifth state, or the eighth state based on the information about the first microcomputer.

6. The motor control apparatus according to claim 3, wherein the microcomputer includes a first microcomputer and a second microcomputer,
  wherein the instruction current generation portion includes a first instruction current generation portion and a second instruction current generation portion,
  wherein the offset correction value storage portion includes a first offset correction value storage portion and a second offset correction value storage portion,
  wherein the first microcomputer includes the first instruction current generation portion, the first current control portion, the first PWM duty ratio signal generation portion, the first detected current correction portion, the first offset correction value storage portion, and a first inter-microcomputer communication portion,
  wherein the second microcomputer includes the second instruction current generation portion, the second current control portion, the second PWM duty ratio signal generation portion, the second detected current correction portion, the second offset correction value storage portion, and a second inter-microcomputer communication portion,
  wherein the first inter-microcomputer communication portion acquires information about the second microcomputer that is transmitted from the second inter-microcomputer communication portion,
  wherein the second inter-microcomputer communication portion acquires information about the first microcomputer that is transmitted from the first inter-microcomputer communication portion,
  wherein the first instruction current generation portion generates the first instruction signal so as to maintain the third state, the sixth state, or the ninth state based on the information about the second microcomputer, and
  wherein the second instruction current generation portion generates the first instruction signal so as to maintain the third state, the sixth state, or the ninth state based on the information about the first microcomputer.

7. The motor control apparatus according to claim 3, wherein the microcomputer controls the driving of the first driving circuit with a first frequency, and controls the driving of the second driving circuit with a second frequency different from the first frequency.

8. The motor control apparatus according to claim 1, wherein the microcomputer includes a first microcomputer and a second microcomputer,
  wherein the instruction current generation portion includes a first instruction current generation portion and a second instruction current generation portion,
  wherein the offset correction value storage portion includes a first offset correction value storage portion and a second offset correction value storage portion,
  wherein the first microcomputer includes the first instruction current generation portion, the first current control portion, the first PWM duty ratio signal generation portion, the first detected current correction portion, and the first offset correction value storage portion,
  wherein the second microcomputer includes the second instruction current generation portion, the second current control portion, the second PWM duty ratio signal generation portion, the second detected current correction portion, and the second offset correction value storage portion, wherein the first microcomputer controls the driving of the first driving circuit based on a first clock signal, the first clock signal being a clock signal of the first microcomputer, and wherein the second microcomputer controls the driving of the second driving circuit based on a second clock signal, the second clock signal being a clock signal of the second microcomputer.

9. The motor control apparatus according to claim 1, wherein the microcomputer includes a first microcomputer and a second microcomputer, wherein the instruction current generation portion includes a first instruction current generation portion and a second instruction current generation portion, wherein the offset correction value storage portion includes a first offset correction value storage portion and a second offset correction value storage portion, wherein the first microcomputer includes the first instruction current generation portion, the first current control portion, the first PWM duty ratio signal generation portion, the first detected current correction portion, and the first offset correction value storage portion, wherein the second microcomputer includes the second instruction current generation portion, the second current control portion, the second PWM duty ratio signal generation portion, the second detected current correction portion, and the second offset correction value storage portion, wherein the first offset correction value storage portion stores a first maximum phase offset correction value as the maximum phase offset correction value and stores a first minimum phase offset correction value as the minimum phase offset correction value, and wherein the second offset correction value storage portion stores a second maximum phase offset correction value as the maximum phase offset correction value and stores a second minimum phase offset correction value as the minimum phase offset correction value.

10. The motor control apparatus according to claim 1, wherein the first detected current correction portion generates the first u phase detected current signal, the first v phase detected current signal, or the first w phase detected current signal by correcting the first u phase detected current, the first v phase detected current, or the first w phase detected current based on the maximum phase offset correction value or the minimum phase offset correction value even when the second driving circuit is in a stopped state, and wherein the second detected current correction portion generates the second u phase detected current signal, the second v phase detected current signal, or the second w phase detected current signal by correcting the second u phase detected current, the second v phase detected current, or the second w phase detected current based on the maximum phase offset correction value or the minimum phase offset correction value even when the first driving circuit is in a stopped state.

* * * * *